United States Patent
Cheng et al.

(10) Patent No.: US 11,064,833 B2
(45) Date of Patent: Jul. 20, 2021

(54) LOW-PRESSURE COOKING METHOD AND COOKWARE VESSEL ADAPTED FOR THE SAME

(71) Applicant: Meyer Intellectual Properties Ltd., Kowloon (CN)

(72) Inventors: Stanley Kin Sui Cheng, Hillsborough, CA (US); Edward S Sherman, Santa Rosa, CA (US); Chun Wing Wong, Hong Kong (CN); Kam Yuen Li, Hong Kong (CN); Hin Hang Homer Cheung, Hong Kong (CN)

(73) Assignee: Meyer Intellectual Properties Limited

( * ) Notice: Subject to any disclaimer, the term of this patent is extended or adjusted under 35 U.S.C. 154(b) by 1662 days.

(21) Appl. No.: 14/285,126

(22) Filed: May 22, 2014

(65) Prior Publication Data
US 2014/0348987 A1 Nov. 27, 2014

Related U.S. Application Data

(60) Provisional application No. 61/826,913, filed on May 23, 2013, provisional application No. 61/890,060, (Continued)

(51) Int. Cl.
*A47J 27/04* (2006.01)
*A47J 27/08* (2006.01)
(Continued)

(52) U.S. Cl.
CPC .................. *A47J 27/04* (2013.01); *A23L 5/13* (2016.08); *A47J 27/004* (2013.01); *A47J 27/08* (2013.01);
(Continued)

(58) Field of Classification Search
CPC ..... A47J 27/04; A47J 2027/043; H05B 6/062; A23L 1/0121
See application file for complete search history.

(56) References Cited

U.S. PATENT DOCUMENTS

| 3,800,778 A | 4/1974 | Lohr |
| 4,381,438 A | 4/1983 | Goessler et al. |

(Continued)

FOREIGN PATENT DOCUMENTS

| FR | 2931648 A1 | 4/2012 |
| GB | 2080143 A | 3/1982 |

(Continued)

OTHER PUBLICATIONS

ISR PCT/US2014/039253.

*Primary Examiner* — Steven N Leff
(74) *Attorney, Agent, or Firm* — Akerman LLP

(57) ABSTRACT

Food stuffs are cooked at precise temperatures, which are optionally below 100° C., in a vessel that is evacuated to exclude air, in which low pressure steam replaces the air. When a sufficient quantity of air is excluded and replaced with water vapor, the temperature of vapor is accurately measured inside the vessel below the lid to control the temperatures within about 1° C. Air is preferably excluded via a controlled heated process for a relatively short period of time at high temperature to generate steam, the temperature is lowered to condense water vapor upon which the lid will sealingly engage the rim of the vessel, forming a partial vacuum in the cooking vessel.

9 Claims, 20 Drawing Sheets

Related U.S. Application Data filed on Oct. 11, 2013, provisional application No. 61/897,698, filed on Oct. 30, 2013, provisional application No. 62/001,176, filed on May 21, 2014.

(51) Int. Cl.
- *A47J 27/00* (2006.01)
- *H05B 6/12* (2006.01)
- *A23L 5/10* (2016.01)
- *A47J 36/32* (2006.01)
- *H05B 6/06* (2006.01)

(52) U.S. Cl.
CPC ............ *A47J 36/321* (2018.08); *H05B 6/062* (2013.01); *H05B 6/129* (2013.01); *H05B 6/1236* (2013.01); *A47J 2027/043* (2013.01); *H05B 2213/06* (2013.01); *Y02B 40/123* (2013.01)

(56) References Cited

U.S. PATENT DOCUMENTS

| | | |
|---|---|---|
| 4,803,344 A * | 2/1989 | Wolf .................. A47J 27/62 219/492 |
| 5,235,903 A | 8/1993 | Tippman |
| 5,318,792 A | 7/1994 | Tippmann |
| 5,662,959 A | 9/1997 | Tippman |
| 5,700,996 A | 12/1997 | Lee et al. |
| 5,767,487 A | 6/1998 | Tippman |
| 5,993,878 A | 11/1999 | Tippman |
| 6,152,024 A | 11/2000 | Tippman |
| 6,630,650 B2 | 10/2003 | Nicholas et al. |
| 8,373,102 B2 | 2/2013 | Sakaibara |
| 2002/0117497 A1* | 8/2002 | Bassill .................. H05B 6/062 219/626 |
| 2003/0038131 A1 | 2/2003 | Nomura et al. |
| 2010/0156645 A1 | 6/2010 | Beck |
| 2011/0006054 A1* | 1/2011 | Garcia .................. A47J 27/004 219/433 |
| 2012/0152932 A1 | 6/2012 | Moon |

FOREIGN PATENT DOCUMENTS

| | | |
|---|---|---|
| JP | 2004261287 A | 9/2004 |
| JP | 2005310517 A | 11/2005 |
| JP | 2008175422 A | 7/2008 |
| WO | 2013/064348 A1 | 5/2013 |

\* cited by examiner

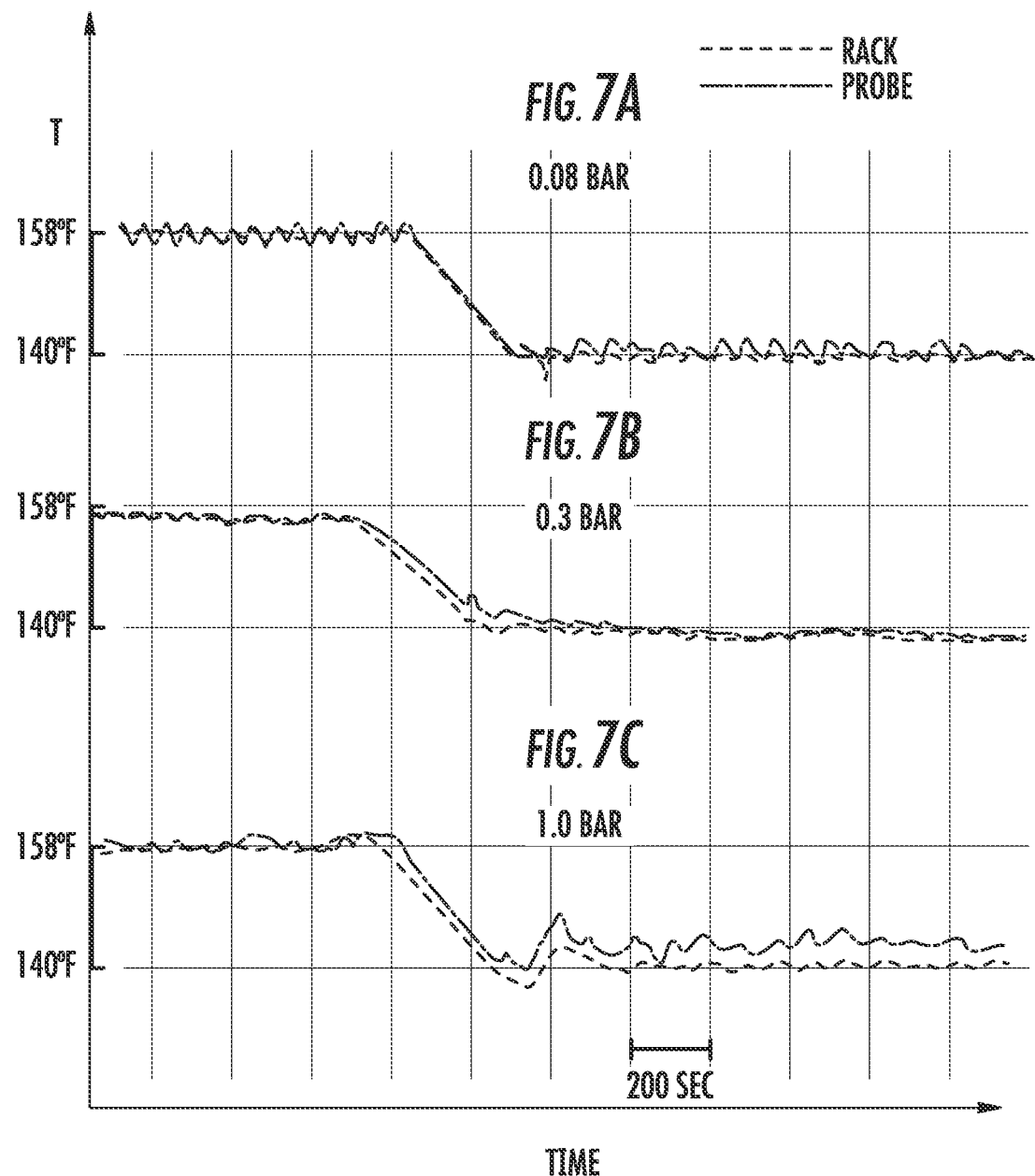

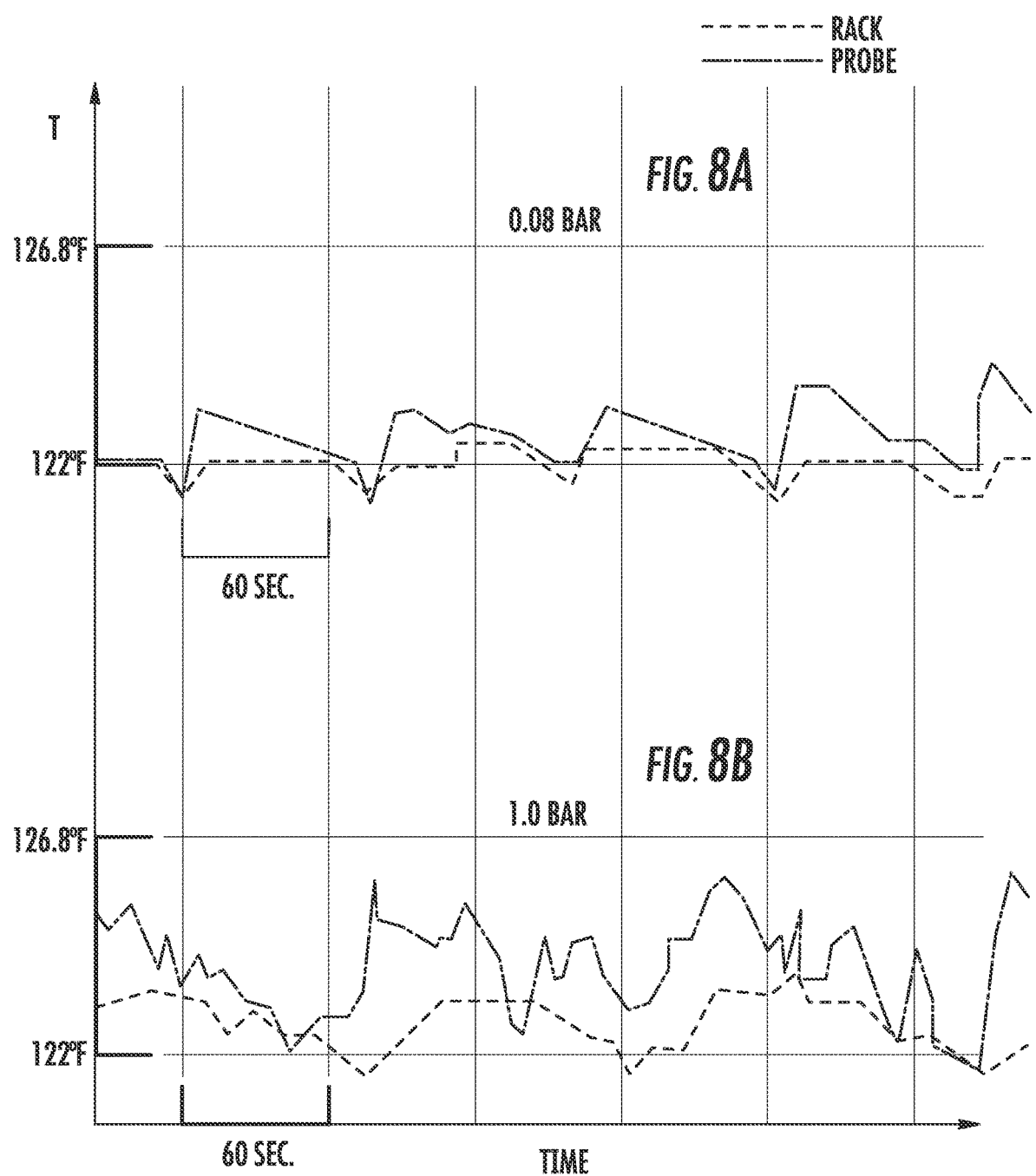

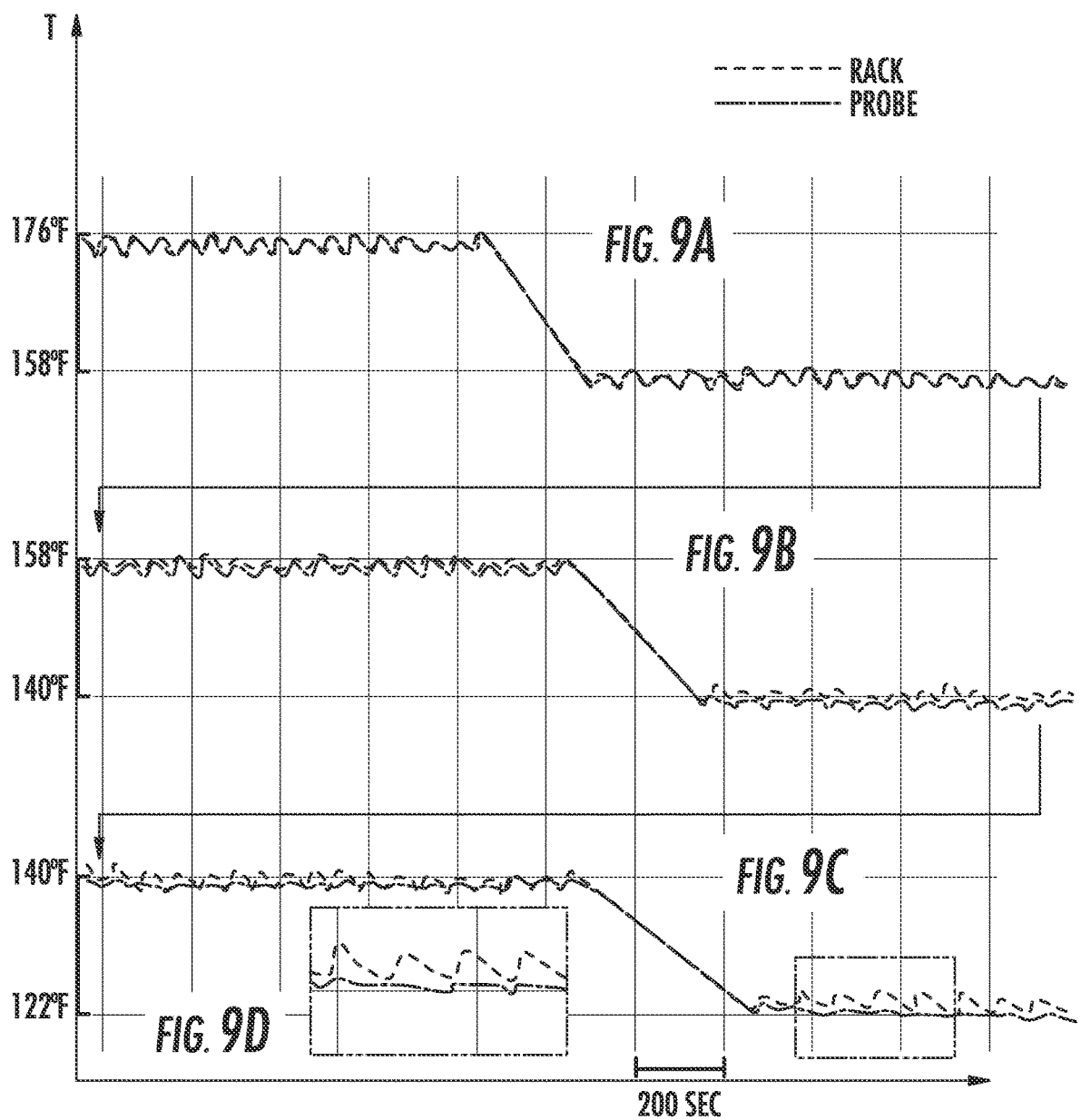

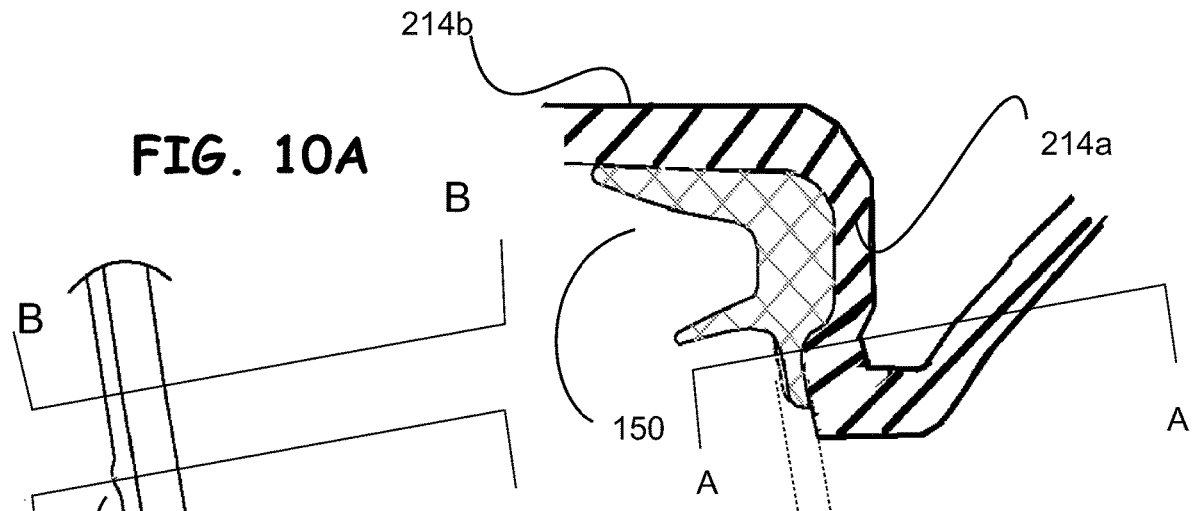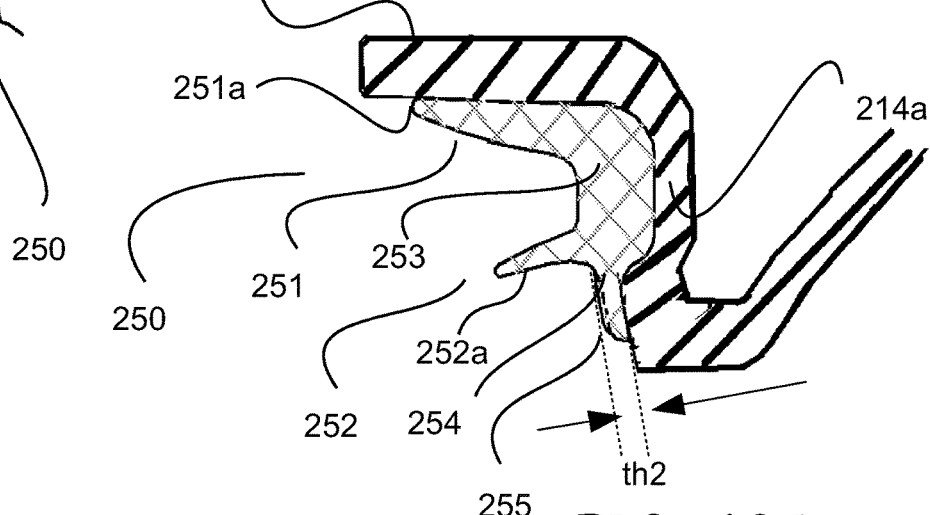

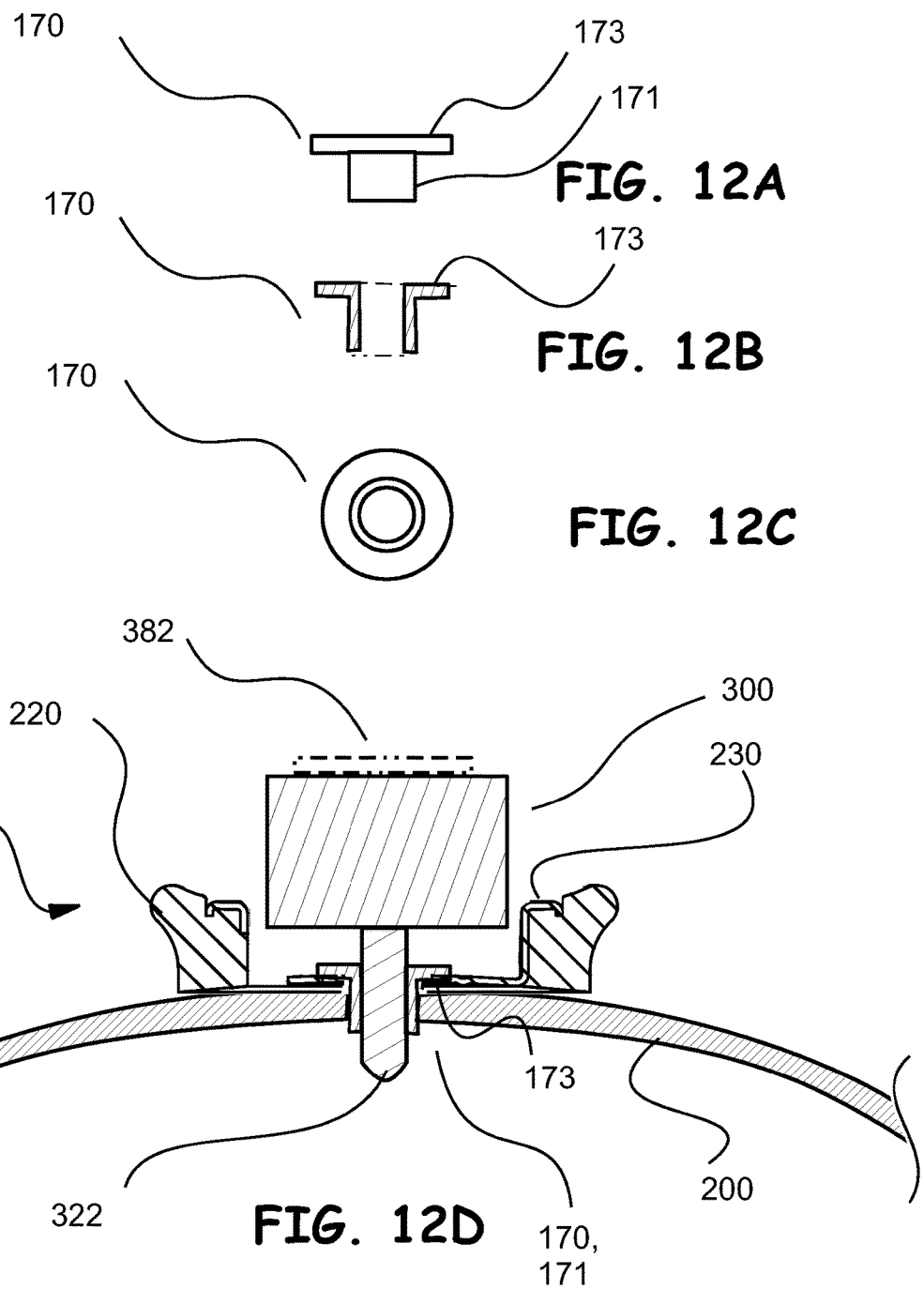

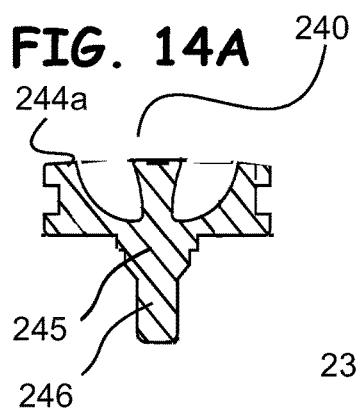
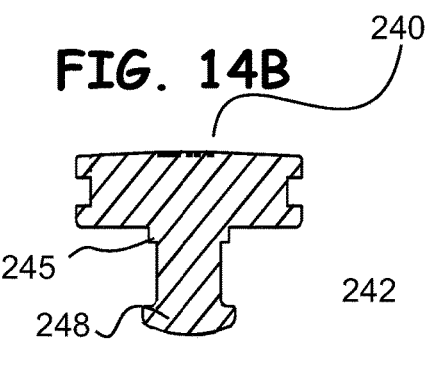
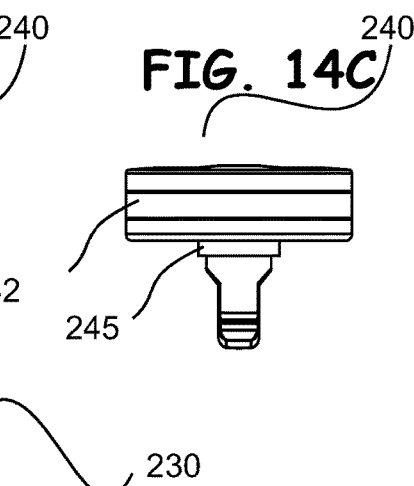
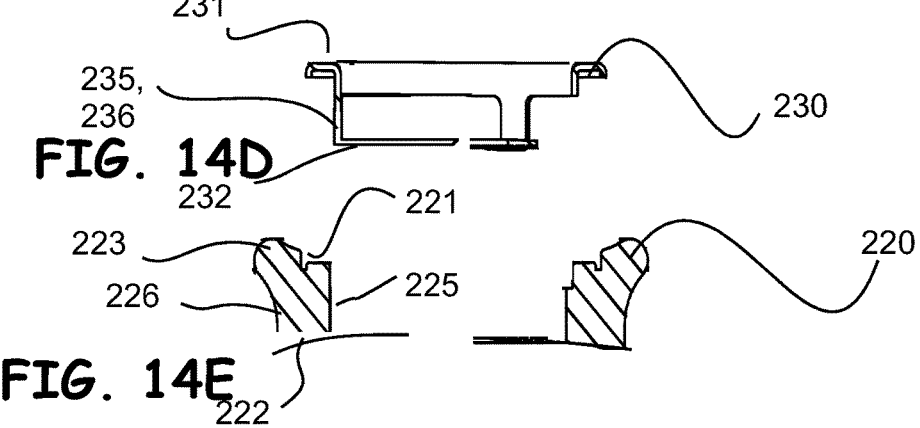
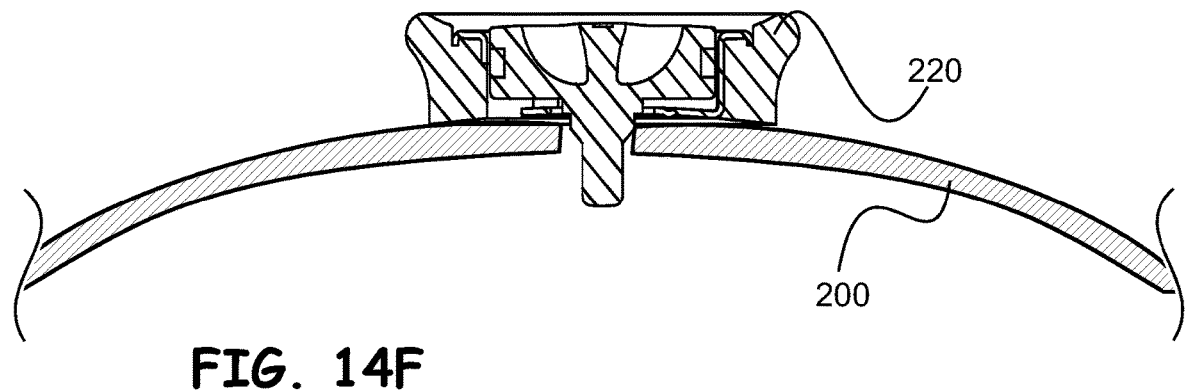

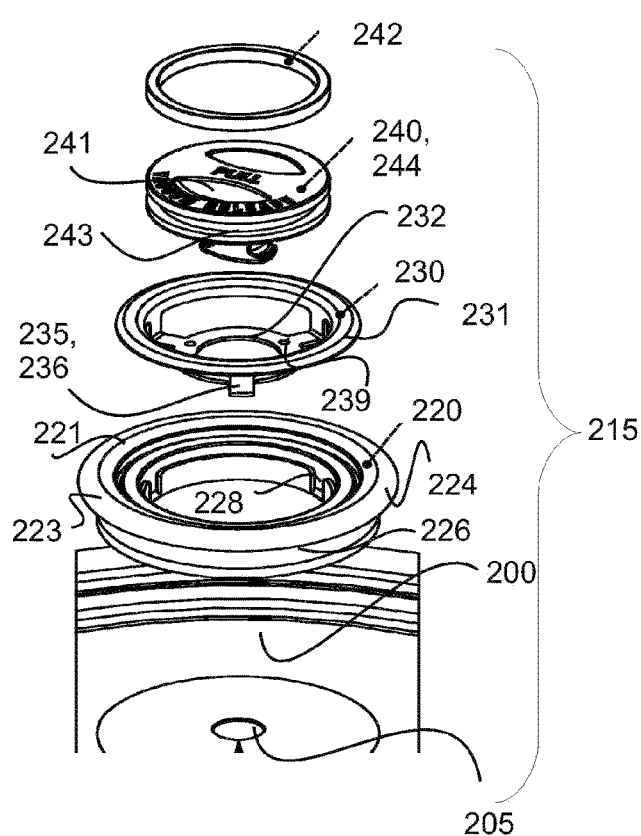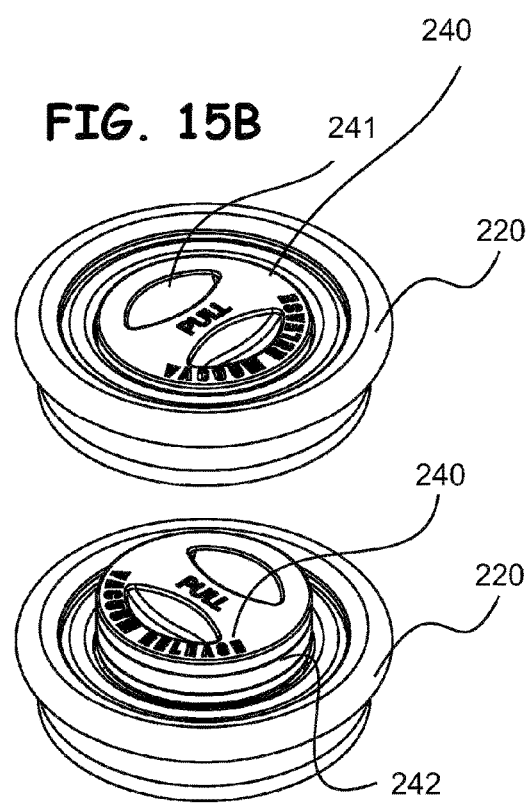

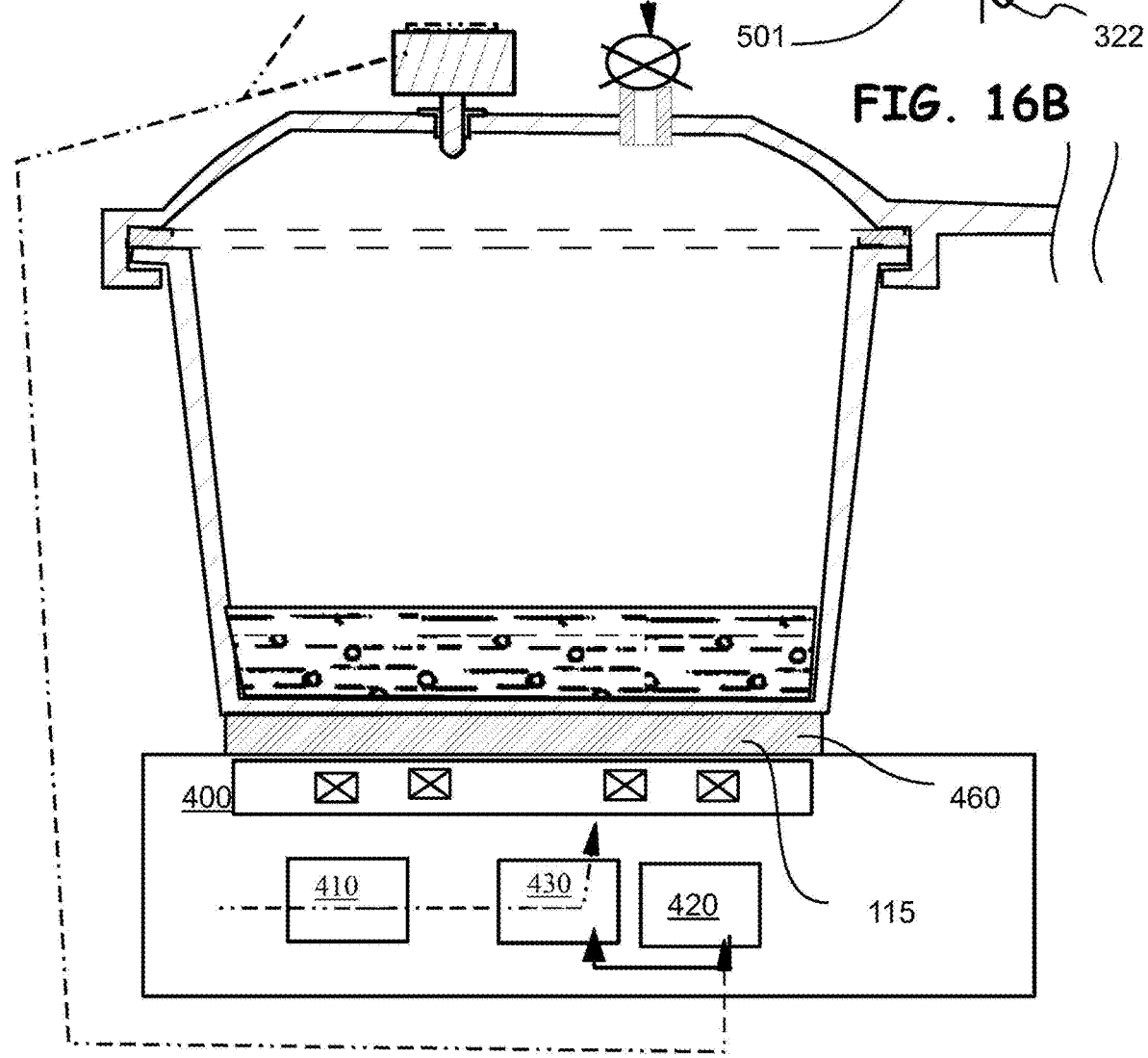

LOW-PRESSURE COOKING METHOD AND COOKWARE VESSEL ADAPTED FOR THE SAME

CROSS REFERENCE TO RELATED APPLICATIONS

The present application claims the benefit of priority to the following U.S. Provisional patent applications: appl. Ser. No. 61/826,913 filed May 23, 2013; Appl. Ser. No. 61/890,060 filed Oct. 11, 2013; Appl. Ser. No. 61/897,698 filed on Oct. 30, 2013; and Appl. Ser. No. 62/001,176, filed on May 21, 2014, all of which are incorporated herein by reference.

BACKGROUND OF INVENTION

The present invention relates to methods of cooking food, and particularly cooking food under controlled temperature conditions, and suitable cookware vessels and equipment for this method.

Prior methods of controlled cooking include the so-called Sous Vide process, in which foodstuffs are sealed in plastic bags, and the sealed bags are then immersed in a temperature controlled water bath. The water bath temperature is specific to the foodstuff intended to be cooked, and in the case of animal proteins is sufficient denature some of the proteins, and depending on the nature of the animal proteins may also be sufficient to dissolve collagen, and/or affect other chemical conversions of foodstuff components to a precise level. However, since the internal food temperature will never exceed the water bath temperature, the cooking time must be sufficient for the interior of the food to reach this temperature. Cooks use either guidelines or experience to determine the cooking time, and frequently the desired cooking temperature. Alternatively, needlelike temperature probes can be inserted through foam seal in plastic bags to actually measure the internal temperature of the food during cooking, and hence terminate cooking when the entirety of the food has reached the desired temperature. Such termination is preferred in the case of fish and other proteins that would seriously degrade upon excess maintenance at this temperature, in contrast to other proteins sources such as what are generally considered inferior cuts of meat, that are generally tough due to the high collagen content. In such cases, the cooking time is extended for hours, if not days, to at least partially dissolve a large percentage of such collagen to tenderize the meat.

While the use of plastic bags to hold the foodstuffs can be helpful for flavoring some foods, as well as for immediately cooling and freezing the cooked food within the bag, this adds expense and complications for the general consumer. In particular, it should be noted that it is difficult to vacuum seal bags that contain fluid, unless very expensive equipment is used, and these processes are time-consuming. The vacuum sealing process increases food preparation time as compared to other cooking methods, despite the fact that the cook is free to do other things in the kitchen during the entire cooking, due to the constant temperature of the water bath, which largely precludes overcooking many types of food.

However, such water baths with precise temperature control are expensive, consume considerable counter space and in many cases also continuously fill the kitchen with water vapor. Further, cooking is delayed by the time it takes to fill and heat the water bath.

Another method of cooking food at low temperature, i.e. below the atmospheric pressure boiling point of water (100° C. or 212° F.) is in a reduced pressure chamber. U.S. Pat. Appl. No. 2003/0038131 A1 discloses such a methods in which a lidded microwave transparent container is heated in a microwave oven. The container lid has a gasket to seal with the container, and a central one way valve to release steam. The foodstuffs are heated by microwave so they release water, which along with added water turns to steam at high microwave powers. As the one way valve is designed to limit air return when the steam condenses to water, a vacuum is formed in the container. While a relatively short initial heating period can be used to expel air with expanding steam, the foodstuffs would already be directly cooked to some degree by the initial microwave exposure. Hence, for delicate or thin foodstuffs, the benefits of low temperature cooking would still not be obtainable. The application also failed to teach or disclosure how to maintain a subsequent temperature or pressure within the vessel.

U.S. Pat. Nos. 5,318,792; 5,767,487; 5,662,959 and 6,152,024 disclose various oven configurations for cooking in low pressure steam atmospheres. The ovens are sealed with gaskets, and in fluid communication with an external vacuum pump. The foodstuffs are held above an internally heated water bath. Similar to Sous Vide cooking, the water bath temperature is measured, so that at an equilibrium condition the food would be exposed to the surrounding water vapor of the same temperature. The equipment disclosed in these patents is intended for commercial use, but also had inherent limitations for consumer use. These ovens, being large, are cumbersome and subject to breakdown from moving parts as well as the exposure of heaters to water or water vapor.

U.S. Pat. No. 4,381,438 discloses a cooking apparatus that deploys an induction heating base to heat a cookware vessel. The power to the induction cooking bases is controlled in response to a sensor located in the lid of the vessel. The sensor detects steam, and in response to steam or steam temperature, reduces the heating power. The disclosure fails to provide an indication of the accuracy of the method and the stability of the temperature in the vessel.

It is therefore general object of the invention to overcome the above-noted deficiencies of Sous Vide cooking, in particular to eliminate evacuated sealed plastic bags, but rather use cookware vessels also suitable for general purposes.

It is also an object of the invention to provide a cooking apparatus and method that is capable of cooking various large sized, thick and/or irregularly shaped foods that cooks should not seal in evacuated plastic bags for Sous Vide cooking, as they would have extremely long cooking time, and could pose food safety issues.

It is also an object of the invention to provide a methods to cook such large size, thick or irregularly shaped foods without sealing in a vacuum bags at low temperatures, that is below the boiling point of water, in an accelerated mode in comparison to the long terms required in Sous Vide cooking.

It is another object of the invention to provide these benefits and advances in a cooking method that can uses ordinary heat sources in a consumer kitchen, or at least a specialty heating source that is compatible with other methods of cooking.

SUMMARY OF INVENTION

In the present invention, the first object is achieved by providing a cooking assembly comprising an induction heating base having an upper surface for supporting a cookware vessel, one or more induction heating coils disposed below the upper surface, and a controller that is responsive to energize the one or more induction heating coils, a cookware vessel having a bottom portion adapted to be supported by the upper surface of the induction heating base, substantially upright sidewall extending upward there from to terminate at a rim, the sidewall encircling said bottom portion to form an interior portion capable of retaining a fluid, a lid adapted with a gasket to engage said cookware vessel at the rim thereof to form a vacuum seal therewith, the lid having at least one sealable penetration formed in the surface thereof, a transmitter device adapted for removable supported engagement with the lid and in signal communication with the controller, the transmitter device having a thermal probe that enters an interior portion of the vessel via the sealable penetration of the lid, wherein the controller is operative to energize and de-energize the one or more induction coils to maintain a pre-determined temperature entered into the controller in response to the temperature measured by the thermal probe, wherein the gasket and sealable penetration in the lid are adapted to maintain at least one of an at least partial vacuum and a pressure greater than atmospheric pressure in the interior portion of the vessel, wherein the cooking assembly includes a means to reduce the partial pressure of air in the cookware vessel to 0.3 Bar and less.

A second aspect of the invention is characterized by the cookware assembly wherein the means to reduce the partial pressure of air in the cookware vessel to 0.3 Bar and less is the controller first energizing the inductions coils at least until the thermal probe detects the temperature of about 200° F.

A still further aspect of the invention is characterized by the above cooking assembly wherein the controller is operative to de-energize the induction coils upon at a calculated time after the reception of a signal from the transmitter that a first predetermined temperature is reached, in which the time to reach the first temperature is used to determine the calculated time.

A still further aspect of the invention is characterized by the above cooking assembly in which the calculated time is sufficient to provide for the production of a quantity of water vapor that is operative to expel air from the vessel so that a vacuum seal is formed between the lid and rim via the gasket after the induction coil is de-energized at the calculated time.

A still further aspect of the invention is characterized by the above cooking assembly in which the calculated time is sufficient to provide for the production of a quantity of water vapor that is operative to expel air from the vessel is the time to reach at least about 94°, less 60 seconds, then divided by 2.

A still further aspect of the invention is characterized by the above cooking assembly wherein the transmitter is wireless and comprises a processor to calculate transmit times based on temperature variation with time.

A still further aspect of the invention is characterized by the above cooking assembly wherein the lid further comprises an annular handle that surrounds the sealable penetration in the lid and the transmitter is adapted to nest within the inner annulus of the annular handle, wherein the thermal probe penetrates and seals the sealable penetration via a removable grommet.

A still further aspect of the invention is characterized by a cooking assembly comprising a cookware vessel having a bottom, substantially upright sidewalls extending upward there from to terminate at a rim, the sidewall encircling said bottom portion to form an interior portion capable of retaining a fluid, a sealing means to form a vacuum within the vessel, a heating means for providing thermal communication with said cookware vessel, a controller to modulate the output of the heating means, a thermal probe adapted to measure a temperature of at least a portion of the vessel or the environment thereof, a transmitter device adapted to receive the output of the thermal probe and transmits values thereof to the controller, wherein the controller is operative to energize and de-energize the one or more induction coils to maintain a pre-determined temperature entered into the controller in response to the temperature measured by the transmitter device, wherein the cooking assembly includes a means to reduce the partial pressure of air in the vacuum sealed vessel to 0.3 Bar and less.

A still further aspect of the invention is characterized by the above cooking assembly wherein the sealing means is a gasket and lid and the gasket is adapted to engage a portion of the vessel rim.

A still further aspect of the invention is characterized by the above cooking assembly comprising a sealable penetration in the lid that is closed by a thermal probe portion of the transmitter that extends into the vessel interior.

A still further aspect of the invention is characterized by the above cooking assembly wherein the gasket and sealable penetration in the lid are operable to maintain an at least partial vacuum and a pressure greater than atmospheric pressure in an interior portion of the vessel.

A still further aspect of the invention is characterized by the above cooking assembly wherein the gasket is operative to be urged downward by the lid when the vessel is evacuated so that the visible portion thereof above the vessel rim is disposed below the vessel rim after evacuation.

A still further aspect of the invention is characterized by the above cooking assembly wherein the gasket has an F shape and the sidewall portion of the vessel sidewall below the rim has a curvilinear portion that contacts multiple portions of the F shaped gasket when a vacuum is formed in the interior of the vessel.

A still further aspect of the invention is characterized by a process for cooking, the process comprising the steps of providing a vessel capable of retaining fluid therein having a lid that is in sealable engagement with the rim thereof, introducing at least one of water and an aqueous fluid in the vessel, placing a foodstuff in the vessel, placing the lid on the vessel, heating the vessel to a first temperature at least until the water is converted to a sufficient quantity of water vapor to replace the atmospheric content of the vessel, reducing the heating power to the vessel to bring the vessel to a 2nd temperature lower than the first temperature, wherein the condensation of the water vapor within the vessel causes an internal reduction pressure sufficient to engage the lid to seal with the rim of the vessel, maintaining the vessel at the 2nd temperature for a predetermined amount of time.

A still further aspect of the invention is characterized by the above process wherein the step of heating to a first temperature is from a radiant heat source below the vessel.

A still further aspect of the invention is characterized by the above process wherein the radiant heat source is an induction cooking base.

A still further aspect of the invention is characterized by the above process wherein lid further comprises means to measure the temperature in the vessel and the step of maintaining the vessel at the second temperature further comprises the induction cooking base applying a series of spaced apart power pulses, wherein the temperature rise from each pulse is measured with the means to measure temperature, and the power in each subsequent pulse is determined by the measured variance from the first temperature.

A still further aspect of the invention is characterized by the above process wherein lid further comprises means to measure the temperature in the vessel and the step of heating the vessel to a first temperature at least until the water is converted to a sufficient quantity of water vapor to replace the atmospheric content of the vessel is terminated is a time calculated from a first time to reach a predetermined temperature.

A still further aspect of the invention is characterized by the above process wherein the predetermined temperature is at least about 94°, the time to terminate the heating to the first temperature is the first temperature, less 60 seconds, then divided by 2.

The above and other objects, effects, features, and advantages of the present invention will become more apparent from the following description of the embodiments thereof taken in conjunction with the accompanying drawings.

BRIEF DESCRIPTION OF DRAWINGS

FIG. 6A is a cross-sectional elevation view of an alternative cooking vessel with a preferred lid gasket, whereas

FIG. 7A-C compares the temperature variation within the vessel of FIG. 6A at different levels of replacement of air with water vapor during and between the transition from a first control temperature of 158° F. to control at 140° F.

FIGS. 8A and 8B compare the temperature variation in maintaining a steady state temperature of 120 F that corresponds with and without air replacement according to the process of FIG. 1-4.

FIG. 9A-D compares the temperature variation in maintaining a series of steady state temperature at 0.08 Bar according to the process of FIG. 4.

FIG. 10A-C are cross-sectional views of the gasket and a portion of the vessel lid.

FIG. 11A is a cross-section of the gasket and a corresponding portion of the lid disposed on the vessel rim in a vented state whereas

FIG. 12A-D illustrates a preferred embodiment of the lid handle 215 with a grommet 170 for sealed engagement with the thermal sensor, in which FIG. 12A is an exterior elevation view of the grommet, FIG. 12B is a cross-sectional view of the grommet of FIG. 12A; FIG. 12C is a lower end view of the grommet, and FIG. 12D is a cross-sectional elevation view of an alternative handle assembly showing the grommet and the temperature sensing device disposed within the handle.

FIG. 14A is a cross-sectional elevation view of the valve in FIG. 13, with FIG. 14B being an orthogonal is a cross-sectional elevation view thereof to show the wider portion of the valve stem and the feet, whereas FIG. 14C is an exterior elevation of the valve corresponding to the same orientation as FIG. 14A; FIG. 14D is a cross-sectional elevation view of the ring that secures the handle to the lid; FIG. 14E is a cross-sectional elevation view of the handle and FIG. 14F is a corresponding scale cross-sectional elevation view of the assembled handle, ring and valve attached to the abutting lid portion with the valve in the closed position.

FIG. 15A is a perspective exterior assembly diagram of the handle of FIG. 13-14A-F, before attachment to the lid and FIG. 15B is a perspective exterior view of the handle in FIGS. 13 and 14F with the valve closed, whereas FIG. 15C shows a perspective view thereof with the valve open.

FIG. 16A is a cross-sectional elevation view of another embodiment of the cooking apparatus suitable for low-pressure steam cooking and cooking under elevated pressure in which the steam is hotter than 100° C. (212° F.), whereas FIG. 16B is a cross-sectional elevation of an alternative thermal sensor and vacuum formation means.

DETAILED DESCRIPTION

Figure 1:
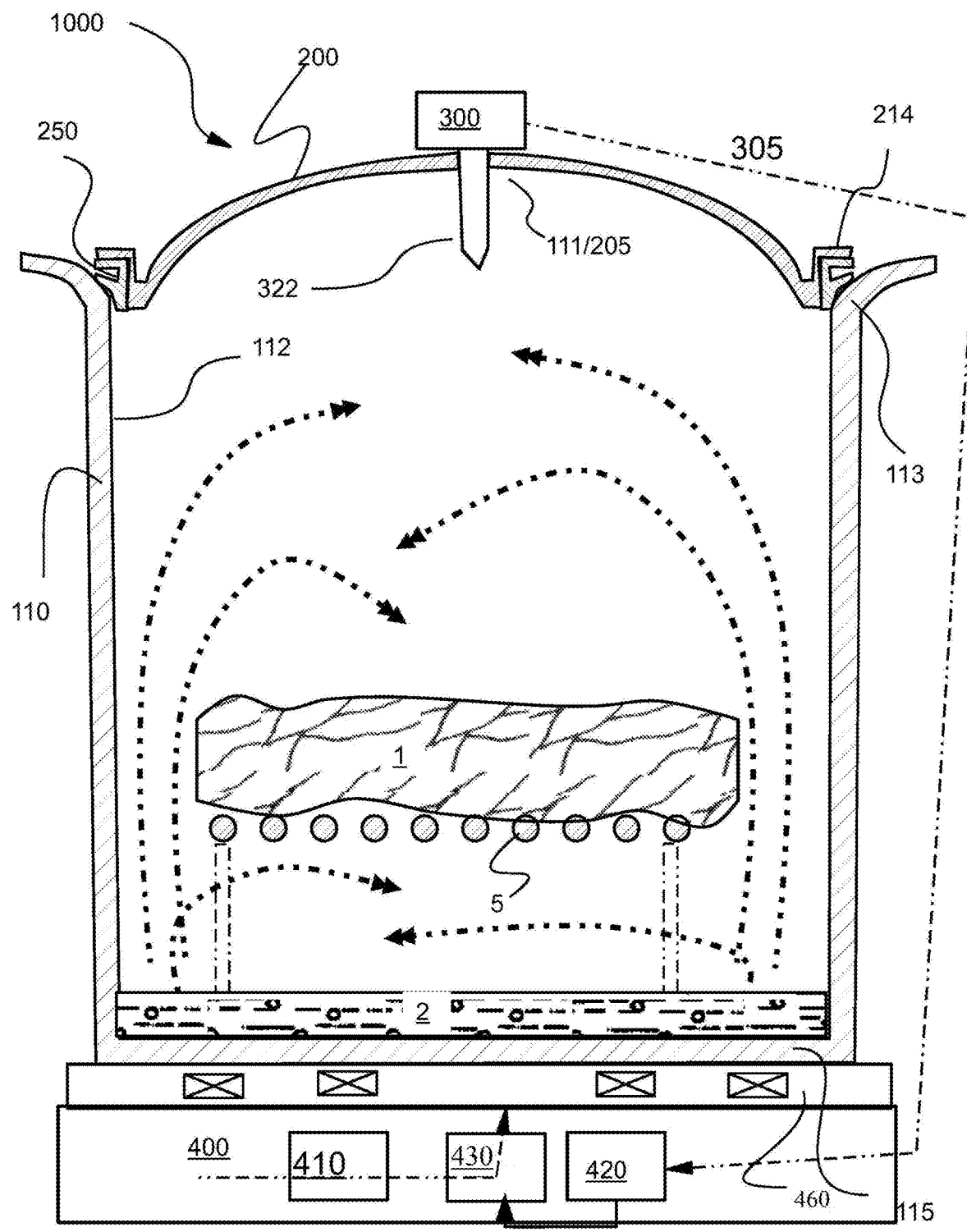
FIG. 1 is a cross-sectional elevation view of the cooking vessel apparatus suitable for low-pressure steam cooking being heated by an induction burner, wherein the lid includes a means to measure the temperature of the vessel contents and communicate with the induction burner for precise temperature control.

Referring to FIG. 1-20, wherein like reference numerals refer to like components in the various views, there is illustrated therein a new and improved cookware vessel assembly for low pressure steam cooking, generally denominated 1000 herein.

The method and apparatus disclosed below allow a variety of foods to be cooked at an optimum temperature, as well as stages of different temperature, which in the more preferred embodiments, enables exceptionally precise control of temperature to achieve a consistent degree of cooking completeness throughout a wide variety of foods.

These results are achieved by discovery of the exceptional temperature uniformity that can be achieved when a vessel is sealed with a very low partial pressure of air, in which the air is replaced by water vapor in a stable equilibrium. This result is most preferably achieved in the configuration of FIG. 1 in which the vessel is heated from below. The cooking temperatures can be well below the boiling point of water at atmospheric pressure, which is 212° F. (100° C.).

Commercial cooking establishments have cooked food at temperatures lower than 212° F. by sealing food in an evacuated bag that is placed in a constant temperature water bath. The evacuated bag is held in the bath for a time sufficient for the center of the food to reach the water bath temperature. This method of cooking is best known by the generic name of Sous Vide cooking, which translated from French means—under vacuum—. Sous Vide cooking, while widely practiced in commercial kitchens, is not in common consumer use.

In accordance with the present invention, it should be first understood that low-pressure steam cooking is process in which foodstuffs need not be sealed in plastic bags before cooking, as they are immersed in a temperature controlled low-pressure steam environment. As the steam does not strip the food of flavor components or vitamins, it is not necessary to seal food and plastic bags or other containers, although such sealing can be practiced when it is desired to exchange or provide flavoring components from a liquid or aqueous media, such as liquid fat or olive oil, or from a poaching liquid such as court bullion.

It has been discovered that with the inventive apparatus all the benefits of Sous Vide cooking can be obtaining without the above limitations associated with it. Such limitations include among others, cooking only foodstuffs in parcels that are relatively small and flat, extended cooking times, as well as an undesirable extraction of fluids from animal proteins into the surroundings of the evacuated plastic bags. Accordingly, the following disclosure will explain how these disadvantages our overcome with the inventive equipment and process.

FIG. 1 illustrates a preferred embodiment of a cooking apparatus 1000 adapted for the inventive cooking method, which includes a vessel 110 that is capable of containing a fluid that has a rim 113 at the terminating upper edge of the sidewalls 112 that surround the sealed bottom 115. The vessel 110 is disposed on a horizontal heating source 400, which is preferably planar, or abuts at least a portion of the exterior bottom of the vessel 110. A lid 200 is adapted for substantially vacuum tight engagement with the rim 113 of the vessel via a gasket 250 that engages and co-seals with the periphery 214 of the lid 200. The lid 200 provides at least one vessel venting means 111. A temperature measurement means 300 is preferably disposed in the lid 200, but can be configured in alternative locations. The temperature measurement is used to control the output of the heater 400 for a desired combination of power, time and temperature to achieve the benefits and advantages summarized above, as discussed in more detail below.

It has been discovered that as the low pressure steam has excellent circulation within the vessel, the cooking temperature can be accurately monitored and controlled using a thermal probe 322 that descends into the vessel 110 interior by only a few mm's via a portal in the lid 200, as shown in FIG. 4-6B. In other words, such a thermal sensor probe constantly monitors the surrounding vapor temperature. Since its accuracy will depend on the efficiency of heat transfer between the probe and its surrounding to reach a thermal equilibrium quickly, it is working at its best in a partially vacuum pot when surrounded mostly by saturated low pressure steam after most of the air has been driven out of the pot. The same portal 205 for inserting the thermal probe 322 is preferably the vacuum vent means.

As a preferred method to form the low pressure steam is by heating or boiling a very small quantity of water to displace air, it has been discovered that a sufficient vacuum for low pressure steam cooking can be obtaining by without an independent pressure measurement, or a separate air pump.

It has also been discovered that a sufficient time period for such boiling can be derived based on the time it takes to heat the water so that the thermal probe is close to the boiling point of water. The time period required to form a low pressure steam atmosphere for cooking is about 50% of the heating time required to bring the measured vapor temperature to 94° C. (201° F.) from room temperature minus 60 second. The time t2 is preferably calculated from t1 by subtracting 60 seconds, then dividing the result by 2.

Hence, in a more preferred embodiment of the invention, the thermal probe measurement is submitted to the controller 430, which logs the time (t1) required to reach 94° C. If the heating time is less than 60 seconds, the heat source 460, preferably an induction burner, will stop heating immediately.

This control scheme has worked under a range of conditions including, variations in pot sizes from 16 cm to 24 cm diameter, using both stainless steel and aluminum cookware bodies, as well as starting the process with between about 30 ml to about 200 ml of additional water in the vessel, independent of food content. The lack of food content was successfully simulated by evaluating this control method with by 200 ml of ice sealed in a bag. In all cases, a vacuum level of at least about 0.3 Bar was achieved on further cooling down to 30° C. ambient temperature.

Under these conditions, a sufficient vacuum to seal the lid 117 under its own weight to the rim 113 via gasket 250 is achieved when the water vapor temperature drops below 95° C. Therefore, low pressure steam cooking can be carried out satisfactorily for cooking temperature up to 190° F. (about 87° C.) without the need to cool below the desired cooking temperature before reheating taking place. In the inventive methods, using various 3-4 liter vessels with an attached induction cookware base and commercial induction heaters, boiling occurs in 60-300 sec. depends on size of pot and water/food content, Subsequent cooling, that is lack of heating for 240-1500 sec. though somewhat dependent on the vessel dimension and water/food content, allows the water vapor temperature to be reduced to the desired cooking temperature with temperature range as low as 50° C. Thereafter, subsequent heating to a higher cooking temperature requires only about 30-90 sec.

Hence, further aspects of the invention include the process for cooking in and holding the steam temperature within at least about 1° C. (1.8° F.), and more preferably 1° F. of the desired cooking temperature.

In the preferred embodiment of FIG. 1, the temperature measurement means 300 deploys a thermal probe 322 that descends downward through a sealed penetration 205 in lid 200 to measure the temperature in the vessel 110 interior in proximity to the rim 113 and the interior of the lid 200. This otherwise sealed penetration 205 is optionally a vessel venting means when the thermal probe 300 is detached from the lid 200. As shown in FIGS. 5, 12A-12D and 16A-16B, the temperature measurement means 300 is also preferably a removable knob or assembly nested in a recess in the annular or knob like handle 215 that is used for gripping and lifting the lid 200. It is also preferable that the vessel lid 117 is dome shaped to provide strength, and more preferably is folded about the lower rim thereof to increase the stiffness at the gasket engaging or accepting portion.

Alternatively, the temperature measurement means 300 is optionally an external thermal sensor, in thermal communication with the interior of the vessel via a sidewall rather that the lid. This internal temperature measurement means 120 thermal probe, such as a thermal couple, thermistor, thermopile and infrared temperature detector and the like. Temperature measurement means can also be a thermal probe attached to the sidewall of a vessel, and more preferably is a thermal probe disposed in thermal communication with the interior wall of a double wall vessel, in which the external signal communication from the thermal probe can optionally be through wiring that extends through or is connected at the exterior sidewall. Alternatively, the vessel 110 may be equipped with a signal feedthrough for a thermal probe such as a thermocouple, or thermistor which is directly inserted into the foodstuff 101.

Figure 17:
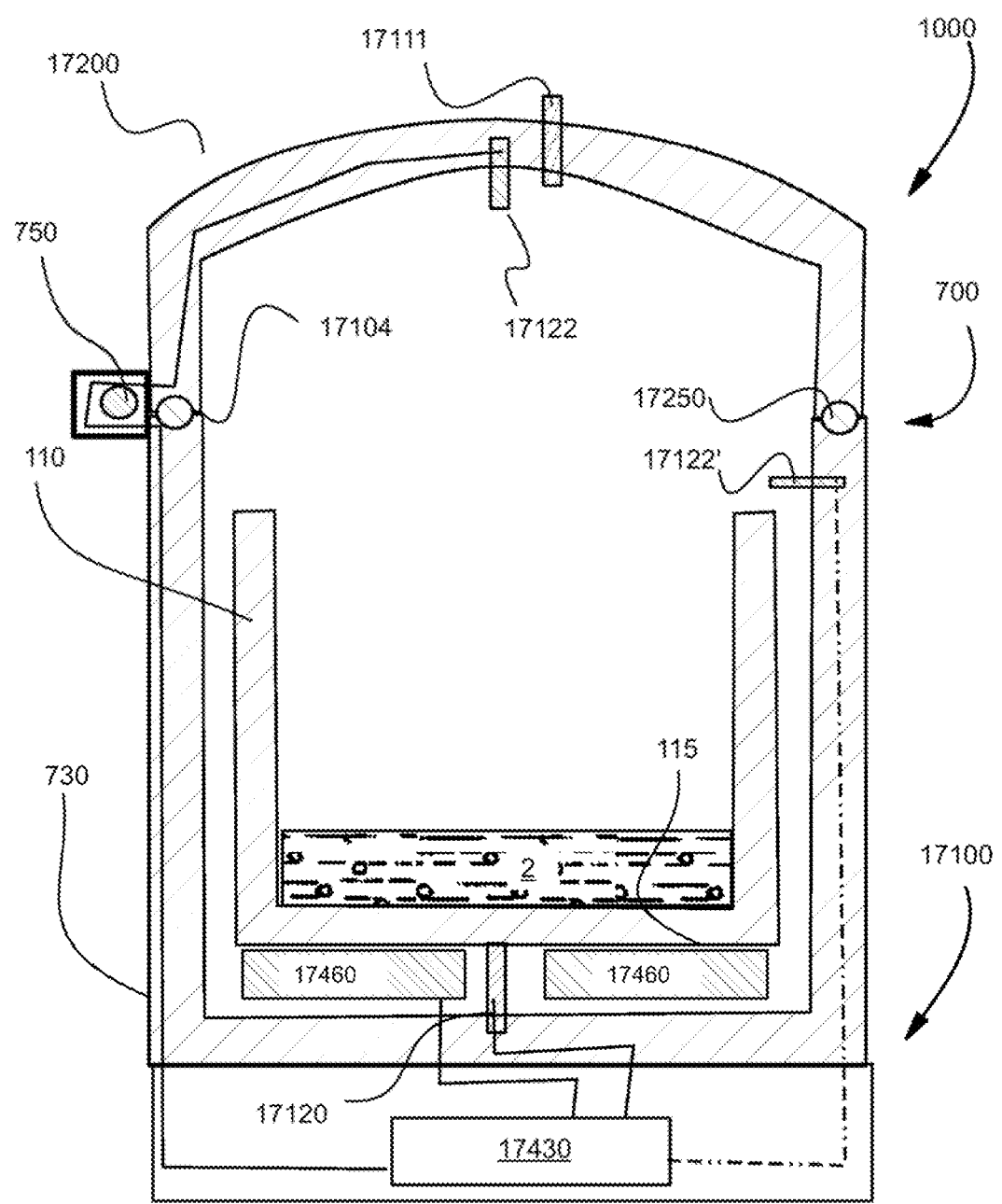
FIG. 17 is a cross-sectional elevation view of another embodiment of the cooking apparatus suitable for low-pressure steam cooking in which the vessel containing the raw food, or food to be warmed is within another vacuum vessel.
Figure 18:
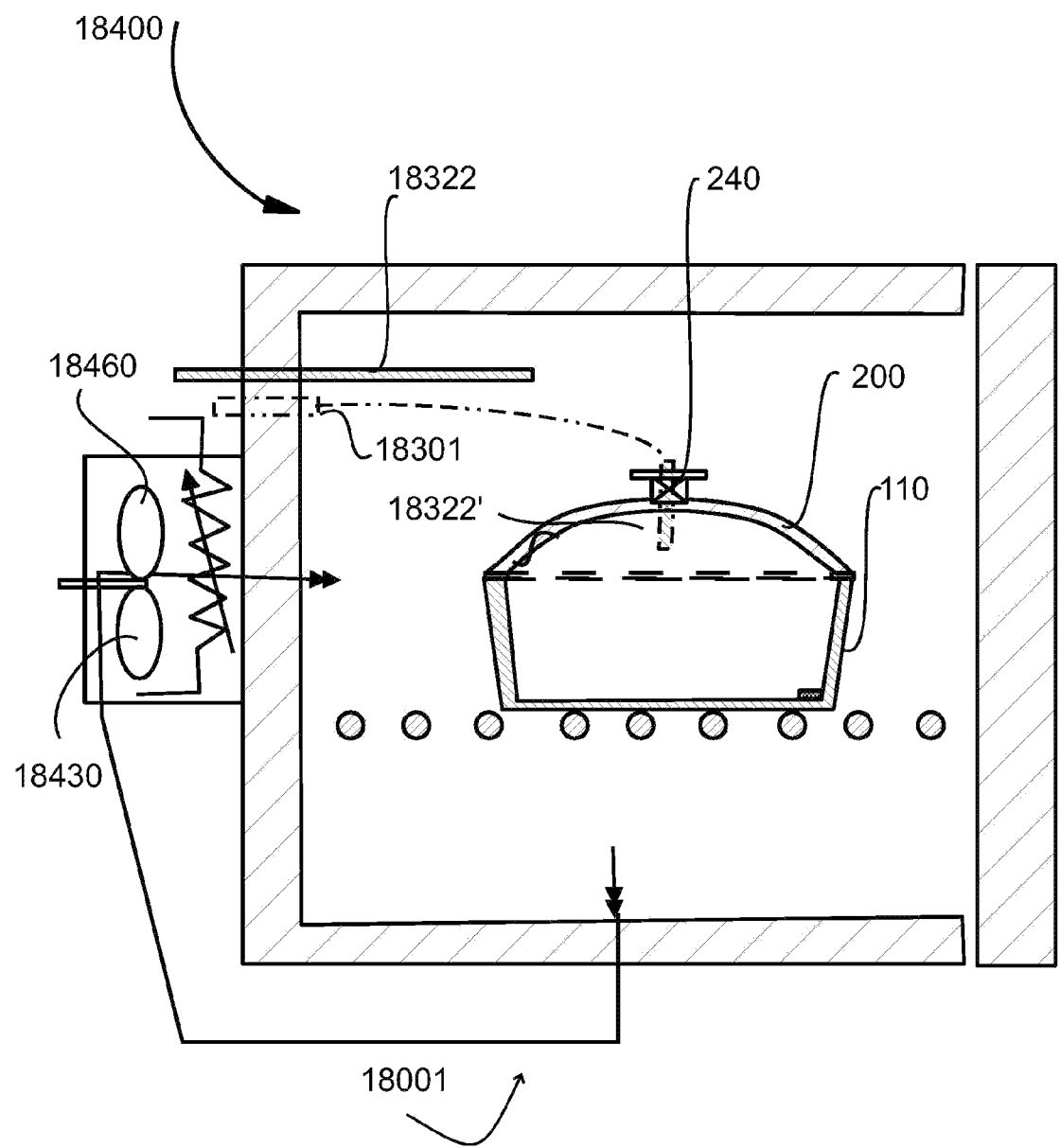
FIG. 18 is a cross-sectional elevation view of another embodiment of the cooking apparatus suitable for low-pressure steam cooking being heated by a surrounding temperature controlled oven.
Figure 19:
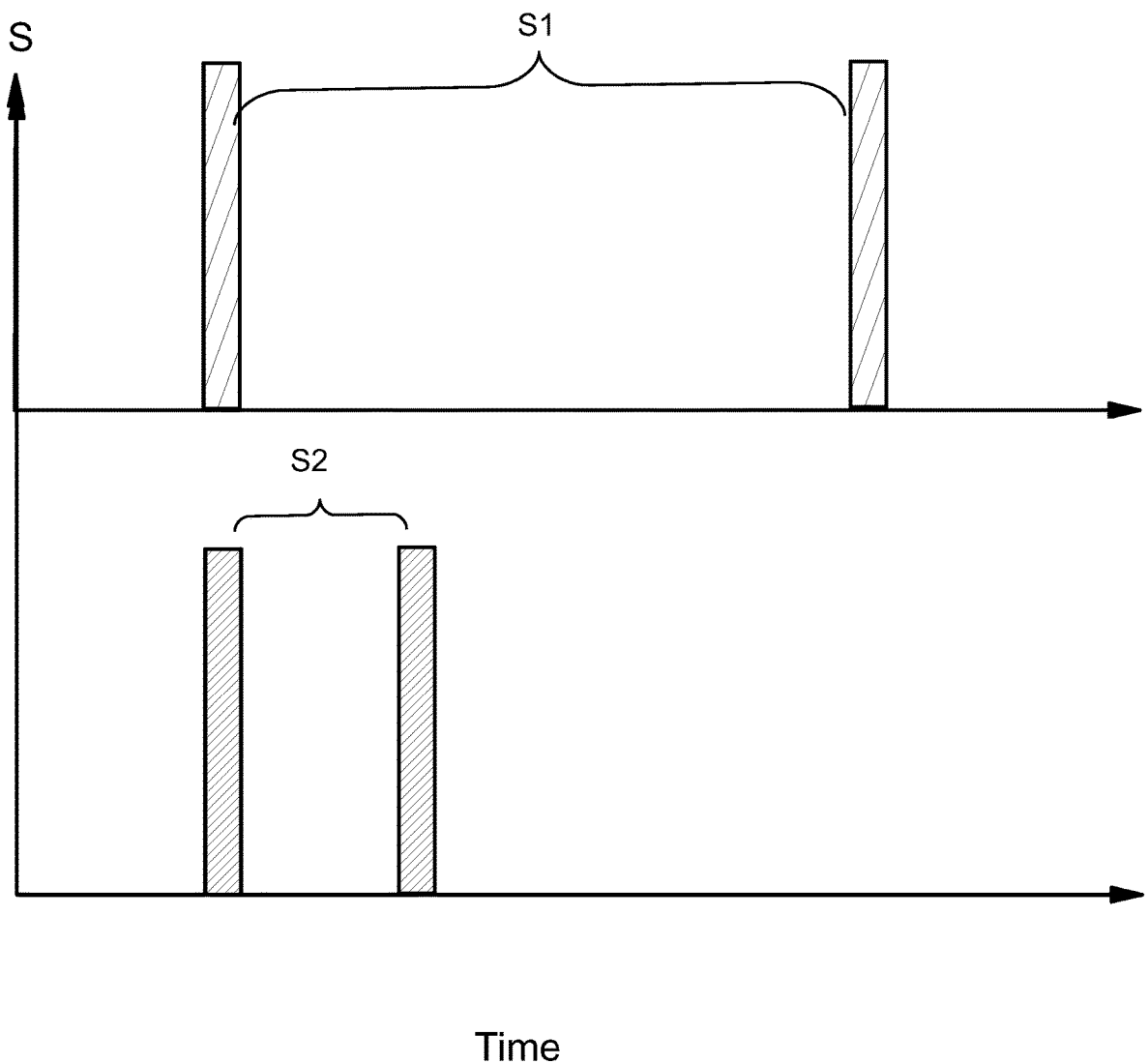
FIG. 19 is a timing diagram for the transmission of signal by two different thermal sensors in close proximity each associated with a different vessel to control the heating source associated with the vessel.

It should also be understood that the temperature control means is optionally resident in the thermal probe, the heating means, or another device, and in addition to the preferred control scheme disclosed below, is optionally a proportional-integral, derivative controller (PID) in signal communication the controller of the output to the heating means. In addition the heating means is preferably an induction burner base, but is also optionally an infrared heating base, a heated metal plate, ring or coil or a gas flame. Alternatively, the heating means can be an oven, as shown in FIG. 17. In FIG. 18, as the heated interior of the oven surrounds the vessel 110, the vessel and its interior will eventually reach the oven temperature of the oven. Heating means or source with a thermal mass, such as heating rings and hot plates, are less preferred as it is more difficult to precisely control the temperature as disclosed in preferred embodiments.

Figure 3:
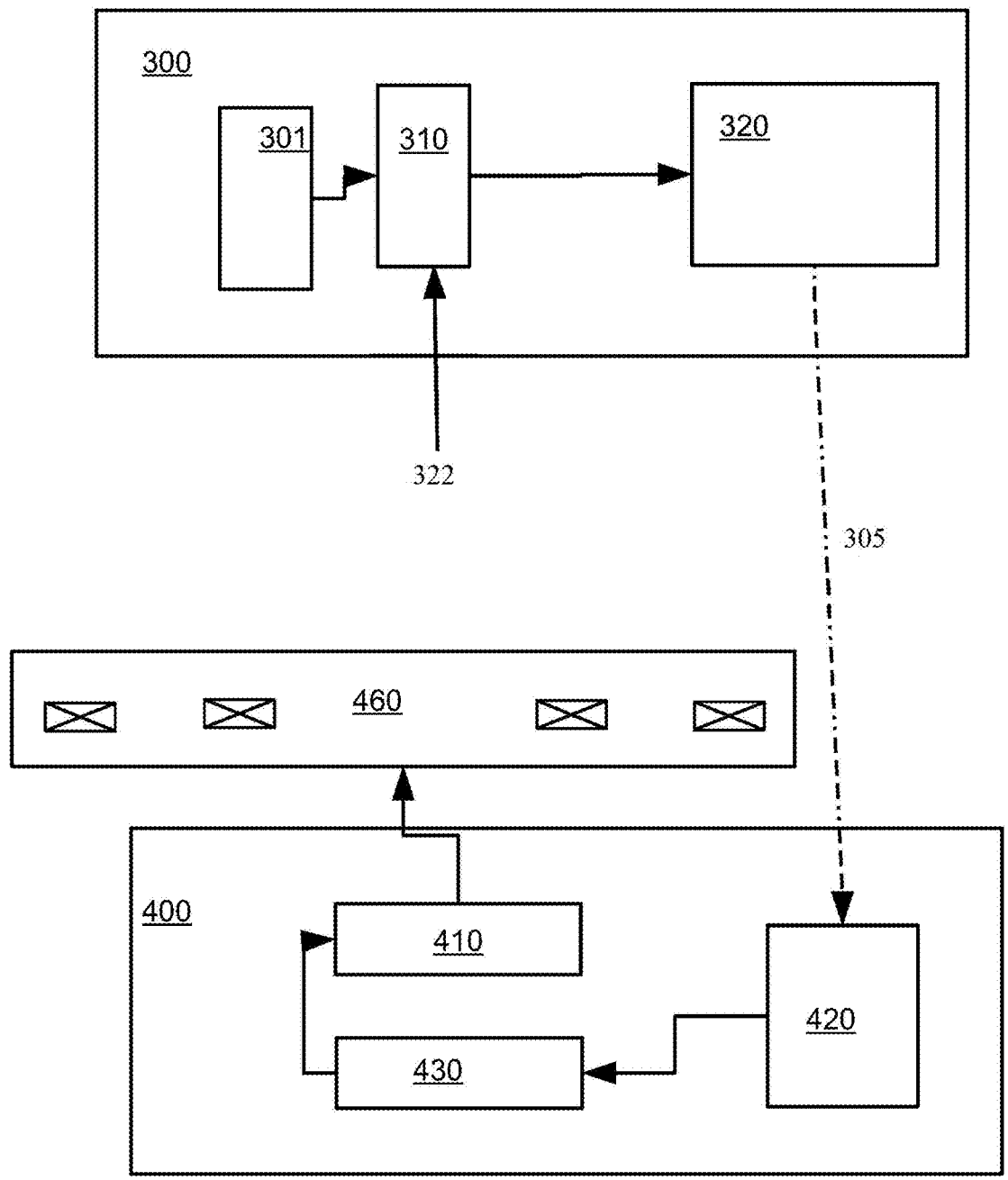
FIG. 3 is a block diagram of the thermal control system for the apparatus of FIG. 1.

As shown in the block diagram of FIG. 3, the preferred thermal measurement means 300 deploys a thermal probe 322 that is in signal communication with an attached signal processor 310 and transmitter 320, which then sends a signal, preferably a wireless signal (such as an RF signal) 305, to a receiver 420 of the heater 400. This signal is communicated to a preferably programmable controller 430 of the heater 400 to modulate the power output from the power supply/source 410 to heater element 460, which provides a predetermined power and/or temperature temporal profile to achieve the desired cooking results. The thermal measurement means 300 preferably contains a power supply 301, transmitter 320 and necessary signal processing unit, such as a microprocessor or controller 310 to convert the temperate probe output to a wireless transmission, such as an RF signal. Controller 430 is preferably programmable in the sense that is has either a series of programs or operation modes that can be selected by the user, with the option of the user entering in parameters, such as times and temperature cycles to effect a program of operation, as well as preset modes, that the controller operational in accord with a previously entered program that can be update an changed in the future. The selection of the programs and the entry of parameters can use any conventional user interface and control panel, such as switches, remote controls, and the uploading of programs from other devices.

An RF signal receiver 420 of the heater 400 can be integrated with the machine housing for the controller 430, power supply/source 410 and induction heating coils 460. In such a case it is also preferable than the RF signal is carried at a frequency (typically 315 MHz) much higher than the induction field frequency (typically 70 kHz) when the heater element 460 is induction coils. In this case, only common commercial precautions are required to achieve the needed signal to noise ratio, even in the presence of the RF noise created by the induction burner. Further, it is preferable to deploy an encoding scheme to reduce the read error rate, however, an error rate of one out of 10 will not affect the cooking process in the preferred process control method of the induction burner controller 400. An aspect of a currently preferred means to reduce error rates is also the coding scheme for sending temperature information twice, each time with a predetermined delay period in between so that if one of them is successfully decoded, then the updated temperature information will be obtained. It should be understood that controller 430 is preferably a programmable controller that is operative to provide different cooking times, temperatures and time-temperature profiles adapted to the foodstuff to be cooked.

It is also preferable to conserve the life of the battery or power source 301 by limiting temperature information transmission by controller 330. In the case of wireless RF transmission of the temperature measurement by the sensor 300 to the heater 400, the transmission need not be continuous from t1 to t3, particularly during t1, unless the vessel is manually evacuated, it is not necessary to transmit temperature until about 90° C. It is desired to measure and transmit the temperature to the controller 430 in the later part of the cooling process (t2) where a few seconds are needed to cool the content of the pot by 0.1° C.; and in the re-heating cycle as most of the time the temperature is changing very slowly.

Every time controller 430 receives a temperature measurement, it is the most updated temperature of the sensor, being only delayed by the processing time. Hence, in preferred embodiments in which heating times are controlled in response to the temperature changes, then the time of data receipt is logged by the processor 430 as is it needed for making decision, i.e. the induction or other thermal heating member base controller 430 will use the receiving time of each signal or signal packet as a reference. Hence, power can also be conserved by limiting the time of such transmissions in relation to the temperature stability. More specifically, it is preferable that the temperature measurement controller 330 is operative to initiate transmission by 310 at least as frequently as every second if difference between consecutive readings is greater than 0.5° C., every two seconds if difference greater than 0.25° C. and every four seconds if difference not greater than 0.125° C. In this scheme the number of transmission needed is greatly reduced to reduce power consumption by half.

In the cooking method, the foodstuff 1 is optionally supported above the interior bottom of the vessel 110 by a plate, tray or rack 5. The plate, tray or rack 5 can be used to raise the foodstuff 1, above the water 2 that covers the bottom 115 of the vessel 110. Pressure will reduce once steam replaces at least some of the interior air in the vessel 110, provided the gasket 250 or another member acts as a one way valve, so that as the steam cools and condenses, rather than air being sucked back into the vessel, the condensation of steam to water forms a partial vacuum in the vessel. The lid 200 has a sufficient weight in proportion to the pliability of the gasket 250 so that as the pressure reduction (from the condensation of heated water vapor) reduces the pressure within the interior of the vessel 110, the gasket 250 sealably engages both the rim 113 of the vessel 110 and the lower periphery 214 of the lid 110.

Though the absolute vacuum level during subsequent cooking will depend on the temperature, it is highly desirable to displace enough air so that the partial pressure of any air in the sealed and partially evacuated vessel is much less that the partial pressure of water vapor, and more preferable the air has a partial pressure of less than about 0.3 Bar, as measured when the vessel 110 is cooled entirely to room temperature.

Figure 2:
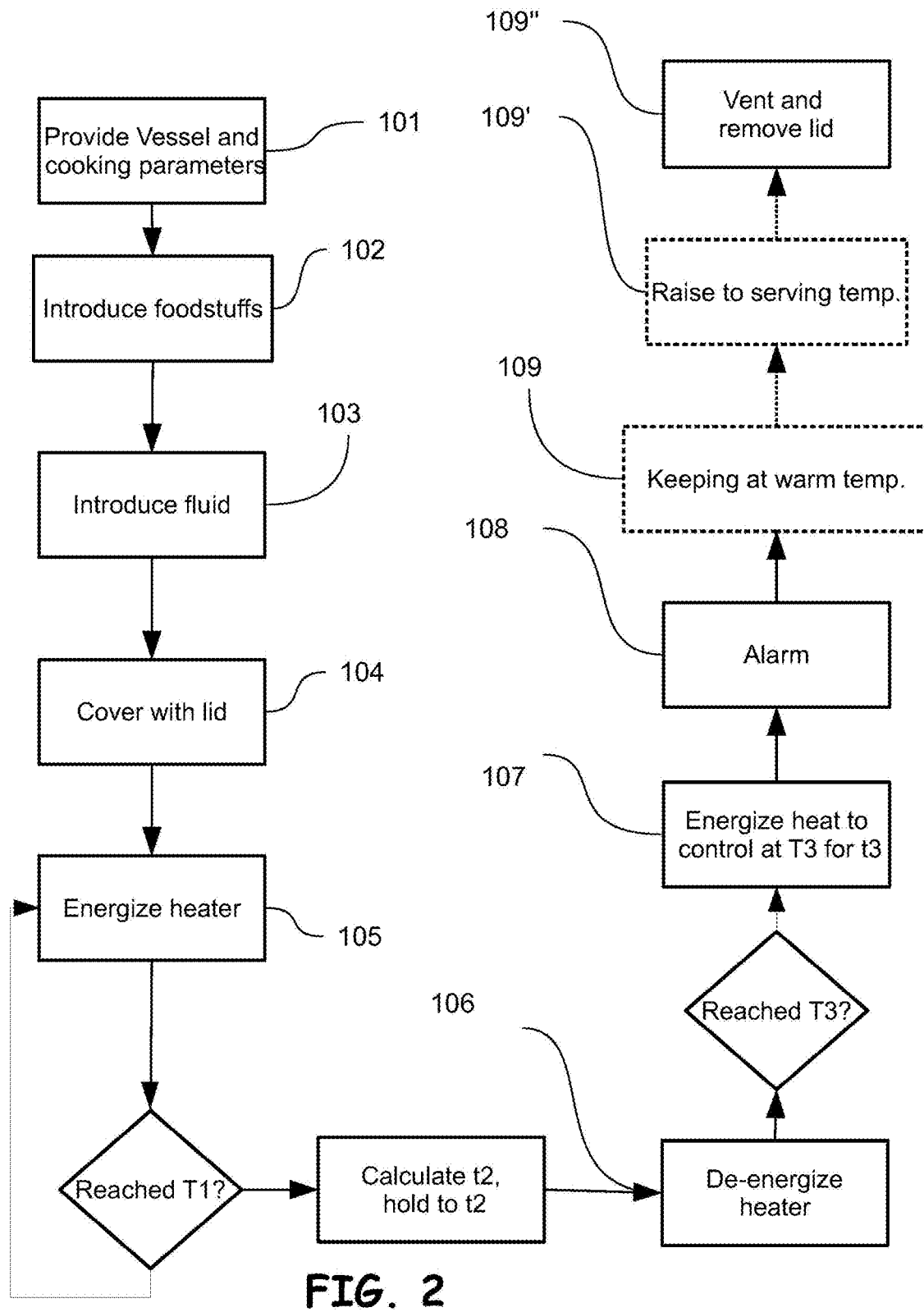
FIG. 2 is a flow chart illustrating the steps in the cooking process using the vessel and lid sensor of FIG. 1.

In a preferred embodiment of the method, the low-pressure steam environment is formed in a cookware vessel 110 via the steps in the flow chart of FIG. 2. The first step is providing a vessel 110 (step 101) capable of retaining fluid and introducing foodstuffs in the vessel 110 (step 102), as well as an aqueous fluid (step 103) before sealing the vessel 110 with the lid 120 (step 104) such as by engagement with the rim 113 thereof with the gasket 250 provided about the lid periphery 214. In a preferred mode or embodiment, the bottom 115 of the vessel 110 is placed on a heater 460, and the heater is energized (105) for a time sufficient to raise the internal temperature of the fluid to T1, which is then held for a time t2 prior to de-energizing the heater 460 in step 106. It should be appreciate that the above method is applicable to the various embodiments of the cookware vessel, lid and sensors disclosed herein.

The heating in step 105 is intended to convert a sufficient quantity of water vapor to replace the atmospheric content of the vessel 110. Then after step 106, the interior of the vessel 110 will cool to a 2nd lower temperature (T2 or T3') than the first temperature (T1), wherein the condensation of the water vapor within the vessel 110 causes an internal reduction pressure sufficient to engage the lid 200 to seal with the rim 113 of the vessel 110. Then in step 107, the vessel is maintained at an at least one 2nd temperature (T3) for a predetermined amount of time (t3), which is preferably is counted as starting from the end of t2.

It should be appreciated for delicate foods that would cook quickly, it is desired that t1 is as brief as possible, to minimize the total exposure to the highest temperature $T_{max}$, and rapidly reach the cooking temperature T3 or T3'. This is best accomplished by using a vessel 110 that is comparable to the size of the food being cooked, that is without extreme excess volume around the food, and avoiding adding excess fluid. While the fluid must be sufficient in volume to expel the air, this quantity is relatively small given the more that 1000:1 expansion of water to steam at 1 atm. Using excess water with respect to the size of vessel 110 leaves behind a large thermal mass of hot water that will take longer to cool T2 or T3'. Hence, in most applications with vessels ranging in capacity from 1 to 6 liters, only 30 to 60 ml is sufficient.

As induction vessel 110 has a magnetic or other receptor layer 115' in the exterior bottom 115 of the vessel 110 that is heated directly by the generation of eddy currents therein only when the induction coils are energized. When the vessel 110 and contents are not being heated by a thermal mass of non radiant heater, or any other part of the vessel (other than the contents) it is simpler to control the temperature in the vessel, as the vessel and contents are the only thermal masses that can lead to an overshoot of the control temperature. In the case of a radiant heat source such as the induction base, since very little water is needed to displace the air from the vessel, the circulating vapor will respond very rapidly to each instance of heating the receptor layer in the vessel bottom 115. While other radiant heat source can be used, such as IR heaters, the induction heating method is preferred as layer 115' is very thin and has very little thermal mass so that once internally heated, rapidly transfer energy to the interior of the vessel 110.

This vapor flow, in a well or deep evacuated vessel 110, exposes the supported foodstuff 1 to a very uniform and temporally stable temperature during t3. Hence, the thermal probe 322 intruding into the interior of the vessel 110 via a portal 205 in the lid 200 is providing an accurate measurement of the foodstuff's environment. Moreover, any change in temperature is also rapidly detected. This has been verified with a large 32 cm diameter wok shown in FIG. 6A, with the resulting temperature in two location under various heating and vacuum levels shown in FIG. 7A-9C.

Moreover, various methods of controlling the output of an induction heater with digital electronic are well known. U.S. Pat. No. 5,700,996 discloses various means of supplying a predetermined current to the resonant coils of an induction cooker for induction heating a mounted vessel, and is incorporated herein by reference.

U.S. Pat. No. 6,630,650 discloses a digital control system for control of the output power of an induction cooker, and is incorporated herein by reference.

U.S. Pat. No. 8,373,102 discloses an induction cooker with automatic control of the heat output, including in response to selection of a cooking mode, and is incorporated herein by reference.

With an accurate and rapid measurement of temperature feedback to the power controller (by RF or wired connection) the heat source 400 below the vessel 110 is energized precisely as necessary to maintain a steady temperature, or any targeted temperature profile.

Figure 4:
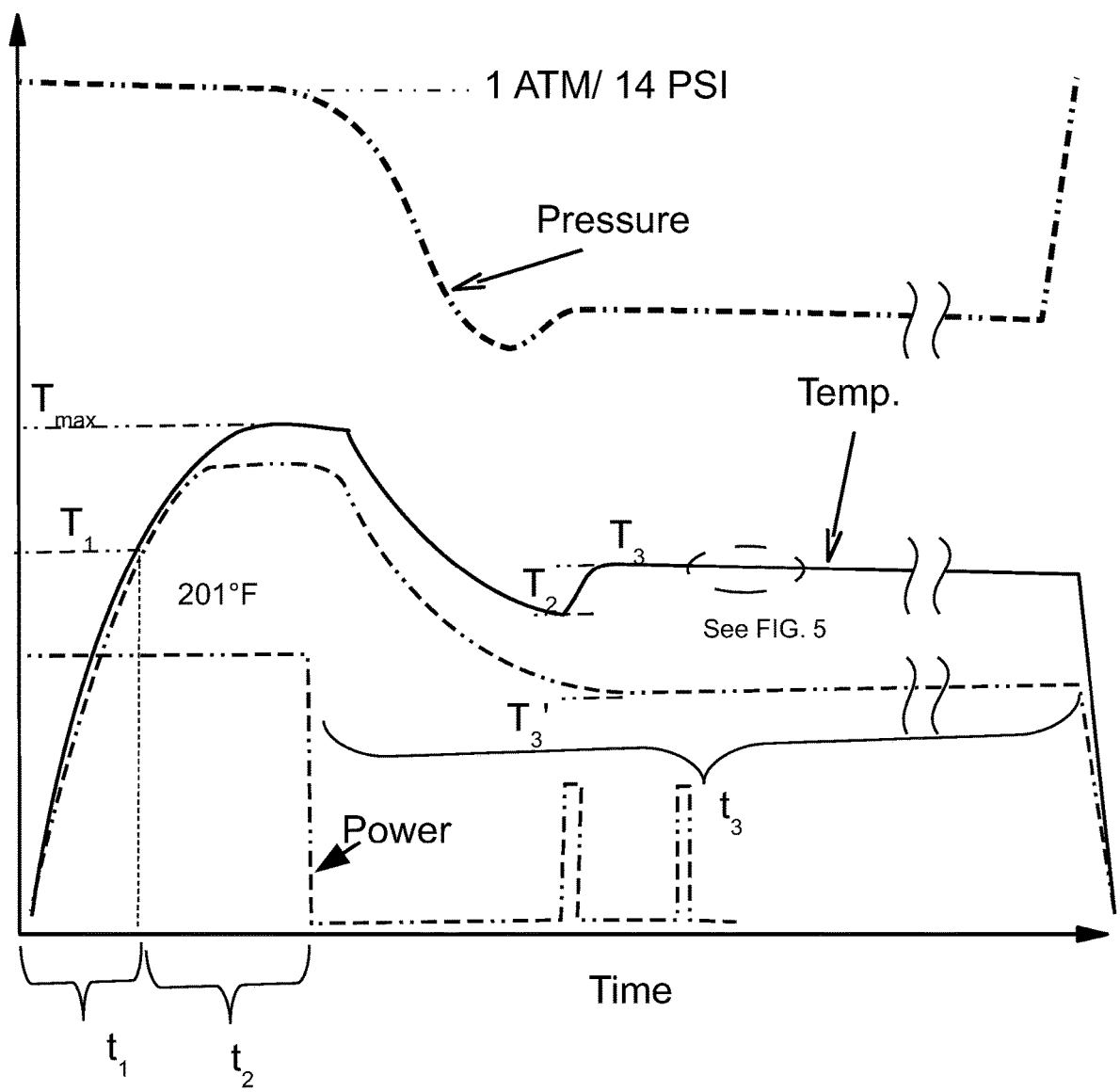
FIG. 4 is a schematic diagram of the temporal variation of temperature and pressure in the vessel of FIG. 1 resulting from a first mode of operation according to the flow chart in FIG. 2.
Figure 5:
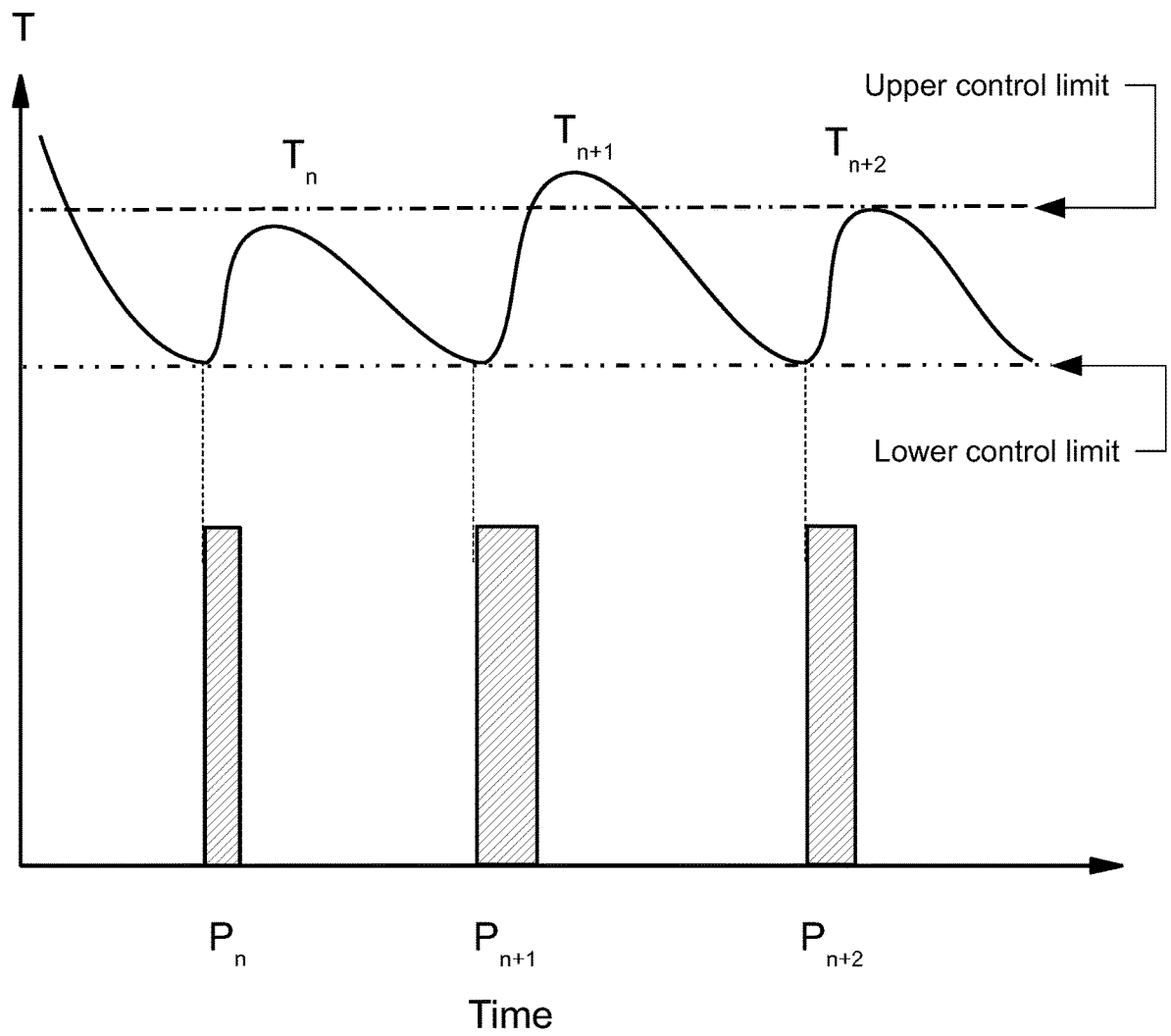
FIG. 5 is a schematic diagram showing the application of power to achieve a consistent cooking temperature, T3, during time t3 in the control regime portion of FIG. 3.

The temperature and pressure during the steps in the process of FIG. 2 are illustrated schematically in FIG. 4. T2 is the temperature sufficient to form a deep vacuum (that is greater than 95% drop from atmospheric pressure that is 0.05 Bar or 0.7 psi) before heating to a higher cooking temperature, T3. If the desired cooking temperature, T3' is lower than T2, cooling is allowed to continue until T3' is reached with a re-energizing of the heater 160 at T2. T2 is generally about 180 to 190° F.

In FIG. 2, the vessel 110 is heated with full power during t1 to reach T1, which is at or below 212° F. The vessel 110 is maintained at this temperature for time t2. It should be noted that as t1 is measured by the control system, as it is predictive of t2, which is the time of additional heating time need to expel air from the vessel 110. When the air is expelled, and the power to the heater is reduced or eliminated so that during the start of t3, the pressure drops. Heating can start again when measured temperature reaches the target cooking temperature T3'. Alternatively, for a higher cooking temperature, the temperature should at least reach T2, to assure an adequate vacuum before being raised to T3, final cooking temperature. In a preferred embodiment, the consumer can visually confirm a sufficient vacuum reached, as it would compress and urge the gaskets 250 down the curvilinear rim 113, it is no a longer apparent. The cooking time t3 optionally includes the times required after t2 to drop the temperature from T1 to T3.

Referring back to FIG. 2, after cooking is complete an alarm or warning light on the base of the heater 400 can be activated (180) indicated to the cook that they can either vent the vessel and remove the lid in step 109" to serve food, or optionally reduce the temperature in step 109 for holding the food until serving, and optionally in step 109'" re-warm the food to a serving temperature in step 109'.

It has been discovered that the low pressure steam atmosphere will heat food relatively rapidly, even at low temperature, in contrast to conventional Sous Vide cooking, in which food is sealed in plastic bags.

Although the vacuum need not exclusively be formed by boiling the water at atmospheric pressure, the optimum conditions to evacuate the vessel 110 has the benefit that food stuff surface is sterilized by the initial steam that is at Tmax, or about 209-212° F., in addition to the lower cost and greater reliability that the addition of an external vacuum pump. In an additional embodiment a mechanical vacuum pump can be housed in the thermal sensor 300, and can run for a predetermined time before the thermal sensor sends an RF signal to the heater 400 to start heating water.

The overcooking of delicate foods during t1 and t2 can also be avoided by placing them on a rack or plate supported above the bottom of the vessel 110, or alternatively by providing thermal barriers, such as wrapping or sealing in plastic films, bags, wax paper, aluminum foil, or organic and/or edible materials such as parchment paper, grape, fig or banana leaves, corn husks and the like.

Alternatively, vacuum can be established by mechanical means, such as a vacuum pump 500, as described in other embodiments. In FIG. 16B, the pump is integrated into the thermal sensor housing 330, with air exhausted through a tube 501 in the grommet, in which the thermal probe 322 is concentric with the tube 501. The double headed arrow shows the air exhaust path form the tube 501 to the pump 500, and from the pump 500 to an exhaust portal 502 on the side of the housing 300.

When the vessel 110 is small (relative to the foodstuff) and the amount of added water or other aqueous fluid (added to create the steam that excludes the air) is not excessive, the vessel 110 interior will promptly cool below 212° F to the desired cooking temperature, avoiding overcooking a delicate foodstuff. In such conditions the thermal mass of the foodstuff precludes heating more than just the exterior to 212° F. In addition, supporting the food on a rack further from the exterior heat source also prevents overheating the foodstuff.

Excess fluid, that is more than necessary to create the boiling film of water shown in FIG. 1, will slow down cooling to the cooking temperature which for cooking proteins can be as low as 128-140° F., as the excess water is simply an excess thermal mass that slows down the cooling process. This is partly illustrated in FIGS. 4 and 19, which plot the temperature change time necessary to reduce the pressure in the vessel 110.

Alternatively, more robust or larger foods can be seared in the vessel at high temperature on one or more sides prior to deploying a lower temperature cooking mode under controlled temperature to cook the foodstuff through the thickness. The juices and flavoring compounds formed during searing can be used to create a sauce or gravy, in combination with additions of one or more of wine, beer, fruit juices and meat, poultry, or fish and vegetable stocks, with the addition of other seasoning. It has been discovered that the subsequent cooking in the sealed vessel at the lower temperatures preserves and enhances the flavors creating in searing, and infuses them into the food stuff. In contrast, unsealed atmospheric pressure steaming can strip foods of natural flavors and vitamins.

Hence, the deployment of the inventive cooking apparatus and methods can produce food of quality comparable to and frequently exceeding that Sous Vide slow cooking, in less time without bagging and vacuum sealing food.

Referring back to FIG. 1, even after displacing air in the vessel 110 (by pump or steam expulsion), a thin layer of water or other aqueous fluid 1 on the bottom of the pan (chamber) is heated by an external heating plate or other source 460, and boils at lower temperature under reduced pressure. The arrows represent the inherent and water vapor circulation that is caused when the water rises in temperatures shifting the equilibrium in the vessel to the production of more water vapor. As will be discussed in further detail below, although the heated steam rises to the top of the vessel 110, the temperature in the vessel 110 is readily controlled in the case of an induction cooker base as the heating element 460. In such conditions the temperature in the center of the vessel 110 will be relatively consistent, even when the temperature is measures for control purposes inside the vessel 110 but just below the lid 220 at thermal probe 322.

Not wishing to be bound by theory, it is currently believed that the penetrating potential of the circulating steam penetrates some foods rapidly, more efficiently than transferring heat than a water bath can to vacuum sealed food. This is somewhat confirmed by the ability of some foodstuffs to absorb aromas from seasoning added to the foodstuff, as well as to the aqueous fluid. Such aromas can be created by aromatic seasoning arranged on the foodstuff, such as ginger, garlic, scallions, onion, lemon grass, or placed in the aqueous fluid. As the vessel 110 is sealed in the process of cooking, volatile flavoring compounds are not lost to the external atmosphere, but preserved and concentrated as a flavor element.

However, this beneficial circulation of low pressure steam arises when the air is expelled and remains excluded. Such conditions are achieved by an optimum gasket design that allows the steam that displaces air to escape during t1 and t2, but also rapidly forms a tight seal at the transition on the initial condensation of steam at the start of t3. If the gasket does not seal the vessel 110 immediately on cooling, then cooler air can be sucked in, and the high vacuum state that uniform and rapid transfer of heat from the receptor portion of the vessel bottom to the water vapor will not be reached, resulting in a larger temperature fluctuation shown in FIG. 7A-9C. In such conditions the thermal measurement will not be adequate, the foods is easily overheated, as well as exposed to oxygen which can destroy some flavor during long cooking cycle.

Hence, it should now be appreciated that the full benefits of the innovative cooking equipment and method are only reached when the vessel 110 construction, heating and measurement, method and control scheme are optimized to work in the cooperative manner disclosed herein.

FIG. 4 illustrates a preferred control scheme to maintain a constant temperature, or series of constant temperatures, after T3 is reached. However, the control method of step 107 can deploy any known process control method. The currently preferred mode deploys a sequence of short energy pulses from the induction bases 400 to raise the temperature when a lower control limit is reach. The lower control limit (LCL) is preferably set at about 0.25° C. lower than T3, whereas the upper control limit (UCL) temp is set at or slightly above the desired cooking temperature, T3 by about 0.375° C.

Hence, FIG. 3 is a schematic plot of the application of short power pulses with time (Pn, $P_{n+1}$ and $P_{n+2}$) showing the typically measured temperature response in the preferred control scheme. When the LCL is reached on cooling from the unpowered mode the induction heater is energized for a brief predetermined time period, a pulse, preferably for about 5 sec., in the case of a 600 W output. The temperature will then rise in response to heating, reaching a peak Tn, associated with the previous power pulse. However, because of heating delays the measured temperature may actually dip slightly below the LCL before rising after the heating pulse. After the recording by the controller 430 of Tn after each pulse, the controller 430 is operative to compare Tn with the UCL, LCL and T3 values to apply an appropriate amount of energy in the subsequent pulse ($P_{n+1}$) as follows: lengthen the pulse to increase the energy when Tn is below T3; shorten the pulse to reduce the energy when Tn is above the UCL, and apply the same energy in the pulse when Tn is between or equal to either the T3 and the UCL. Hence, when the LCL is reached for a second time a subsequent pulse (Pn+1) is applied, however the pulse time is modulated based on the difference between Tn and T3. The pulse width or time is lengthened when the prior pulse resulted in a local temperature maximum, Tn, is below T3, and shortened when the prior pulse resulted in a Tn above the UCL. Subsequent power pulses applied on cooling to the LCL are similarly modulated so the temperature remains between the UCL and T3. It is preferable to provide such a method of pulse width control at the lowest output power setting. Alternatively, the output power can be increased rather than lengthening the pulse width.

A higher than minimum power can also be used with reducing power rather than shortening the pulse width. Alternatively, the temperature rise rate and maximum temperature after each pulse can be used to calculate a subsequent pulse width or power to more precisely limit the rise between subsequent temperature peaks.

Further, the subsequent pulses of reduced power can be applied before the temperature reaches the LCL to provide a reduced fluctuation between eh UCL and LCL.

U.S. Pat. No. 5,004,881 discloses induction cooker base construction and methods of power level control in an induction cooker using a combination of time duty control of the power level and a pulse width modulation control method, which are applicable to this disclosure, and is incorporated herein by reference.

FIG. 7A-9C graph the measured temperatures at probe 322 and a test thermal probe on rack 5 in FIG. 6 in a range of conditions to illustrate importance of air expulsion in step 105 to achieving the tight thermal control necessary for achieving the process control that provides equivalent cooking results to water bath based used in Sous Vide equipment. It should appreciated that during actual measurement induced current into an thermal probe 322, such as a thermistor or thermocouple, can result in short negative spikes in thermal sensor output. As such spikes last the 6±1 sec. of the heating pulses, and pulse generally need to be applied no sooner than 30 to 90 second intervals, such spikes can be ignored in the control scheme or removed with a band pass filter. Pulses of 600 watts of 5 sec. duration are generally applied every 40 to 200 sec when UCL and LCL are between 0.5° C. Alternatively, the UCL can be set slightly above the target cooking temperature, since larger food stuffs that cook slowly will gradually rise in internally temperature, as the heat transfer process is driven by the average cooking temperature between the UCL and LCL.

It should be appreciated from FIG. 7A to 7C that in the condition in which most of the air is expelled (0.08 Bar) while the temperature sensing portion of the probe 322 is positioned just inside the lid 200 it measures a slightly higher temperature after each power pulse, but the rack temperature is much more stable, that is varies less than the circa 0.5° C. (circa 1° F.), which is the temperature difference between the UCL and the LCL. Further, in the well evacuated vessel 110, the probe and rack temperature correlate extremely well on allowing cooling from a first control temperature of 158° F. to a second control temperature of 140° F., when the heater is not energized.

In contrast, as shown in FIG. 7B, at a residual of air equivalent to 0.3 bar a thermal lag is apparent at the rack position and the rack temperature is less stable, that is drifting at circa 140° F. This lag increase further absent air displacement by water vapor (1 Bar in FIG. 7C), as the thermal lag is considerable between the entire cooling stage from 158° F. to 140° F., and the both the probe and rack temperatures drift and vary considerably.

The poor thermal control in the absence of air removal is most apparent at the lower temperature of circa 120° F., as shown in FIGS. 8A and 8B which now compare the and probe 322 temperature to the temperature measured on the rack 5 located at the food supported position below the vessel rim 113 when the LCL is 120° F. In the lowest residual air condition (0.08 Bar) the probe position varies predictably by about 0.8° F., with the rack position stable to less than 1° C., with the probe temperature never exceeding the UCL. However, absent the air removal, as in FIG. 8B, both the probe temperature is not controllable between the UCL and LCL, and the rack temperature thus varies by about 2° F. (more than 1° C.). Further, the measured temperature in the greater than 0.08 bar air evacuated vessel undergo considerable drift over time, in FIGS. 7B and 7C even at higher temperature FIG. 9A-C illustrate the great stability of control in the 0.08 bar condition over a series of temperature plateaus, including the cooling transition between them. At the highest plateaus of 176° F. and 158° F. the rack and probe temperature rise within the UCL after each power pulse. However, at the lower highest plateaus of 140° F. and 122° F., the rack temperature is very stable, and does not rise with the probe temperature or drift.

It should be appreciated that when it desired to limit the initial temperature exposure during air expulsion, this is best achieved with a smaller vessel 110 or setting a lower temperature for Tmax, or time t2, which will somewhat reduce the control capability within the UCL and LCL.

The cooking method and apparatus avoid raising the foodstuff internal temperature to a level at which foods detrimentally change in texture, flavor or nutritional content. In the case of proteins, cooking temperature is the primary determinant of the state of doneness, with the optimum softness and moisture content to provide a satisfying and mouth feel. Overcooking protein makes meat tough, though some animal proteins with a high content of collagen, eventually soften after extended cooking times, when the collagen dissolves. With the inventive apparatus, it is possible to dissolve collagen slowly a lower temperatures without overcooking the protein so that tougher cuts of meat become extremely tender without excess fat, and a flavorful sauce is created in the pan.

The cooking method is believed to preserves vitamins and flavors. Further, the cooking method does not require sealing the foodstuff in a plastic bag. An additional benefit is that only a small quantity of water needs to be used, in contrast to Sous Vide cooking in which a water bath sufficient to immerse the entire plastic bag containing the food is required. Further, in contrast to many types of Sous Vide cooking equipment, the kitchen is not continuously filled with steam. However, nothing precludes sealing food stuffs in a plastic bag or other container and using the low pressure steam as the heat transfer fluid It should also be appreciated that a less preferred but alternative temperature control and measurement means also compatible with an induction burner is an external thermal probe 120 is mounted in the center of the heating plate having a resilient means, such as the spring, then urges the thermal probe to contact the bottom of the cooking vessel 110. Another alternative temperature control and measurement means is when the thermal probe or sensing portion 322 thereof can extends anywhere into the interior of the vessel 110, such as optionally the water 1 in the bottom.

FIG. 10A-11B illustrate the interaction of a preferred gasket 250 with a preferred cooking vessel 110 and portions of the lid 200. The combination provides rapid and stable vacuum sealing during the heating cycle of FIG. 2-3, but allows the vessel to be used with other lids, including the lid shown in FIG. 17, in which the thermal sensor is external to the vessel. The lid rim 214 is configured to form a sealed mated engagement with the rim 210 of the cookware vessel 200. To this end, the lid rim 214 includes a cylindrical portion 214a that is generally parallel with the vessel sidewall 112 when the lid 200 is assembled with the vessel 110. The lid rim 214 also includes an outwardly-extending flange portion 214b disposed at the free end of the cylindrical portion 214a that is generally parallel with the vessel base 115 when the lid 200 is assembled with the vessel 110. Together, the cylindrical portion 214a and the flange portion 214b form an inverted "L" shape for receiving a gasket member 250.

The lid rim 214 includes a pliable gasket 250 that is disposed within the interior angle defined between the cylindrical portion 214a and the flange portion 214b, and extends about the circumference of the lid rim 214. When viewed in cross section, the gasket 250 generally has an upright "F" shape that permits the gasket 250 to matingly engage, and form a seal, with the inner rim 113 of the vessel 110. The gasket 250 includes an upper horizontal arm 251, a lower horizontal arm 252, a vertical portion 253 that extends between the upper horizontal arm and the lower horizontal arm, and a skirt 254 that is an extension of the vertical portion 253 and depends from the lower horizontal arm 252. The upper and lower horizontal arms 251, 252 taper in thickness toward their terminal (e.g., free) ends 251a, 252a. This provides greater flexibility at the free ends 251a, 252a; however, the root, or portion closest to the vertical portion 153, of each arm 251, 252 is made thicker to provide support when the free end deforms to conform to the curved shape of the interior surface 113a of the vessel rim 113 under an evacuated condition of the vessel 110. The upper horizontal arm 251 is longer than the lower horizontal arm 252 to accommodate curvature of the vessel rim 11. The gasket 250 is oriented within the interior angle such that the upper horizontal arm 251 adjoins, and is sealingly mated to, the lid rim flange portion 214b and the vertical portion 253 adjoins, and is sealingly mated to, the lid rim cylindrical portion 214a. In particular, the vertical portion 253 is shaped to conform to the shape of the outer surface of the cylindrical portion 2140a, and thus in some embodiments may be curvilinear. This feature ensures contact by providing a larger sealing area, and secures the gasket 250 to the lid 200 when the vessel 110 is vented by lifting the valve 240 to the open position.

The gasket 250 has centering ribs 255 formed on the skirt 254 that are equidistantly spaced apart about the circumference of the lid rim 214 (FIG. 10A). In the illustrated embodiment, the gasket 250 includes four ribs 255 that are separated by 90 degrees about the gasket center. The ribs 255 protrude outwardly from the skirt 254 toward the vessel sidewall 112. In portions of the gasket 250 between the ribs 255, the skirt 254 has a thickness th1 (FIG. 10B), and in portions of the gasket 250 corresponding to the ribs 255, the skirt 254 has a thickness th2, where th2 is greater than th1 (FIG. 10C). The ribs 255 aid in centering and seating of the lid 200 within the vessel rim 210 to assure a repeatable vacuum seal, and also eliminate vibration during sealing.

Figure 11A:
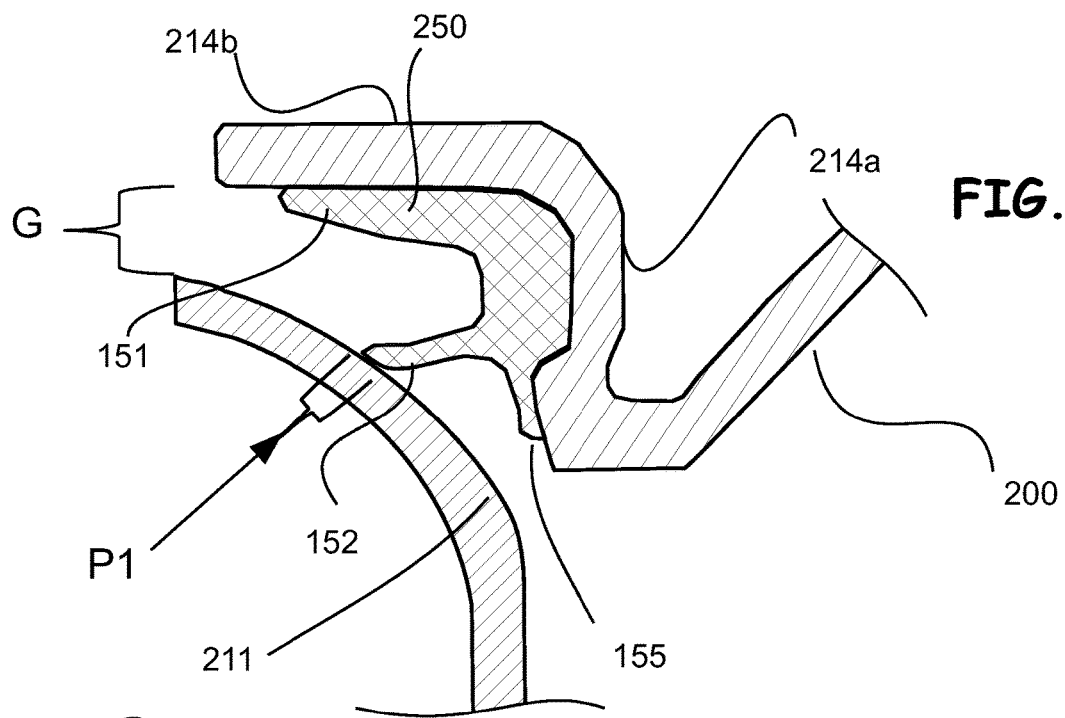

Referring to FIG. 11A, when the lid 200 is assembled with the vessel 110 in a non-vacuum state (e.g., the vessel interior space is at atmospheric pressure) such as during cooking or when the valve 240 is in the open position, the lid 200, the free end 252a of the lower horizontal arm 252 contacts the curvilinear portion 213a of the inner surface of the vessel rim 113 to support the lid 100 relative to the vessel. The arm free end 252a sealingly engages the curvilinear portion 213 over a relatively small area P1, corresponding to the size of the tapered free end 252a along the circumference of the vessel rim 210. The initial contact area is narrow enough to allow vapor to escape without disturbing the lid alignment. When viewed in cross section, the area P1 generally corresponds to a single point of contact. In this position, the upper horizontal arm 251 and the skirt 254 of the gasket 250 are spaced apart from the vessel rim 210, and a vertical gap G exists between the lid flange portion 110b and the vessel rim 210.

Figure 11B:
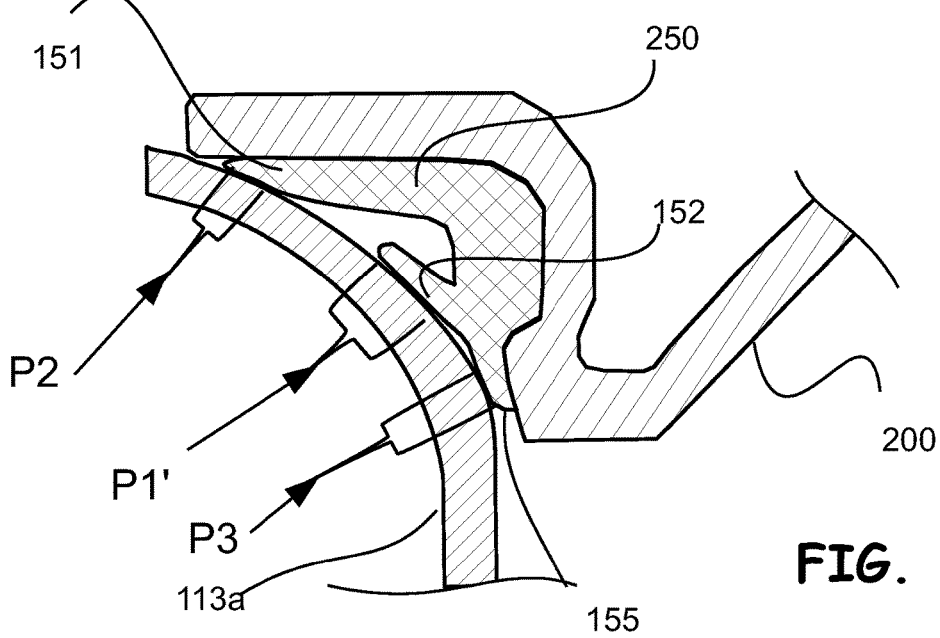
FIG. 11B illustrates the distortion of the gasket and the descent of the lid toward the vessel in the evacuated state.

Referring to FIG. 11B, when the lid 200 is assembled with the vessel 110, the valve 240 is in the closed position (or thermal probe 322 filling gasket 170 disposed in penetration 205), and the vessel 110 is in a slightly vacuum state such as occurs when steam trapped within the vessel condenses, the weight of the lid 200 and the atmospheric pressure enlarge the area contacted by the lower horizontal arm 252. The contact area P1 is enlarged to area P1' by the distortion of the lower horizontal arm 252 as it more fully engages, and conforms to the shape of, the vessel rim surface 211, e.g., P1'>P1. In particular, the side 252b of the lower horizontal arm 252 contacts the curvilinear portion 211 of the inner surface of the vessel rim 210 to sealingly engage the curvilinear portion 211. In addition, the upper horizontal arm 251 sealingly engages the vessel rim surface 113a whereby an upper contact area P2 is formed where the upper arm 251 contacts the rim surface 113a, and the skirt 254 engages the inner wall of the vessel 110 below the rim 113 whereby a lower contact area P3 is formed where the skirt 252 contacts the rim surface 113a and/or vessel sidewall 112. Further, as the lid descends, the vertical gap G provided by the gasket 250 is reduced or eliminated.

By providing multiple seal locations (P1', P2, P3), the vacuum seal reliability is improved and vibration during or after sealing, which can create an annoying audible noise (ringing), is eliminated. In addition, the described configuration precludes the gasket 250 sticking to the rim 113 when the vessel 110 is vented by lifting valve 240 or removing thermal sensor 300.

Figure 6A:
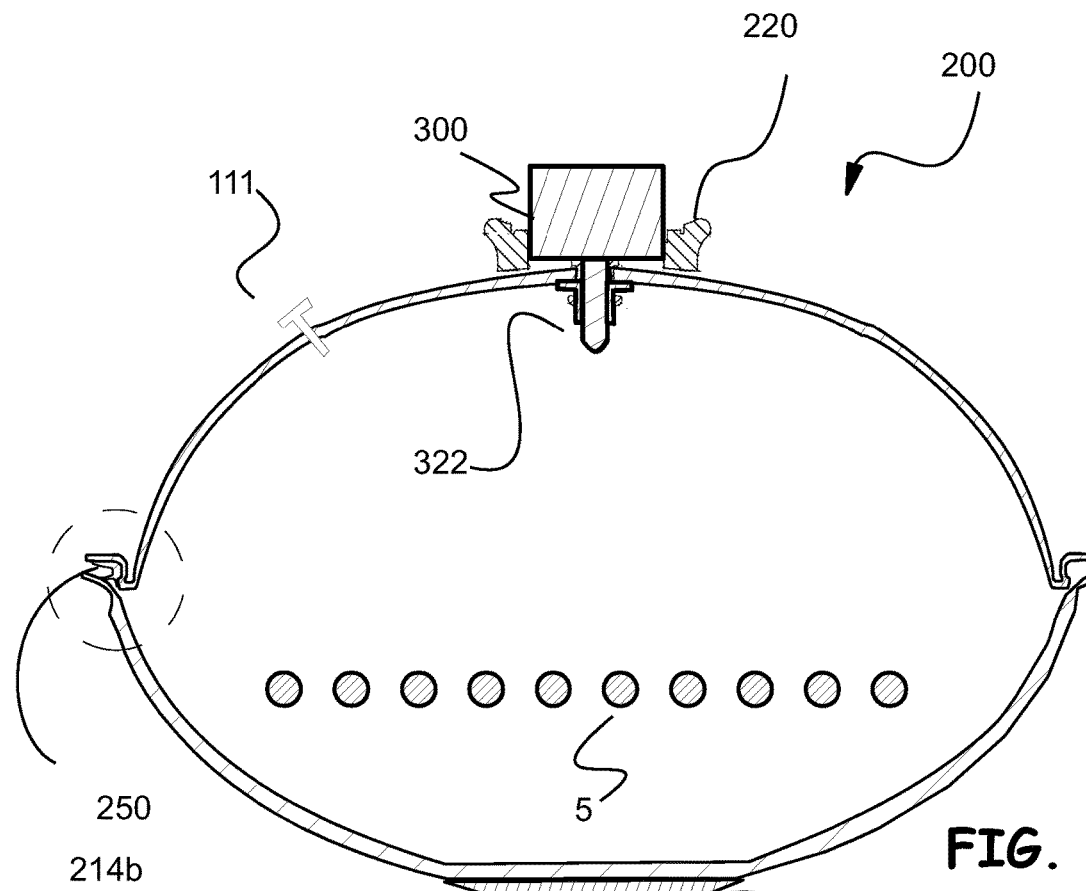
Figure 6B:
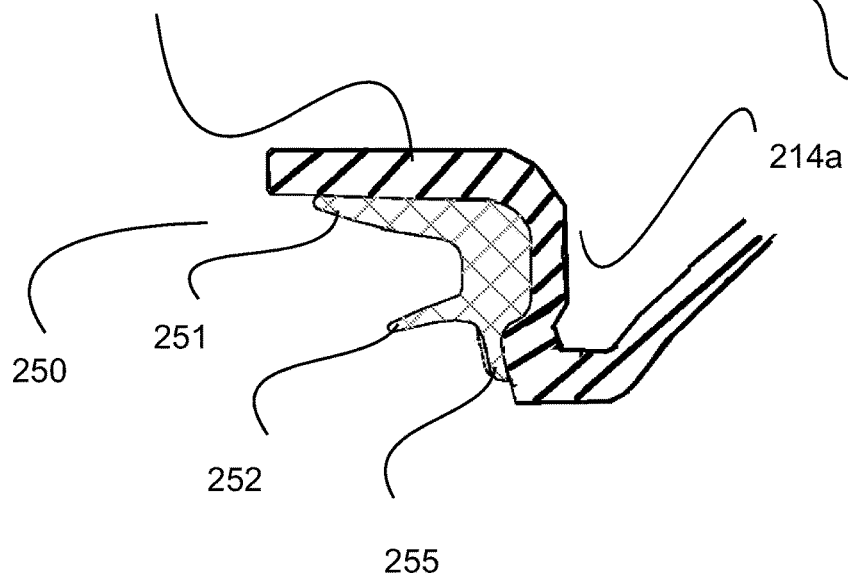
FIG. 6B is a enlarged cross-sectional elevation view of the gasket and a portion of the lid of FIG. 6A.

FIG. 12A-14F illustrate another aspect of the preferred lid 200 that includes the handle 215, as well as a vent valve 240 that can replace the thermal probe when the vessel is used normally, or in an oven as shown in FIG. 17. In alternative embodiments of the invention an alternative vessel venting means 111 is preferably a sealable portal in the lid 200 of the vessel 110, as shown in FIG. 6A.

Referring to FIGS. 12A-12D, although the handle assembly 215 is illustrated with the valve 240 disposed in the opening 205, the handle assembly 215 is not limited to this configuration. For example, in an alternative handle assembly 215, the valve 240 is replaced with the probe 322 and a grommet 170 that lines the opening 205 and supports the probe 322. The grommet 170 includes a cylindrical sleeve 171 that includes an outwardly-extending stop flange 173 formed at one end thereof. When the grommet 170 is disposed in the opening, the stop flange 173 rests on the ring member base plate 132 and retains the grommet 170 in a desired position relative to the opening. The inner surface of the sleeve 171 defines a bore 172. The outer surface of the sleeve 171 is shaped and dimensioned to correspond to the shape and dimensions of the opening 205. The temperature sensing probe 322 is received within the grommet bore 172 in a sealed manner, and the outer surface of the grommet sleeve 171 is fitted within the opening 205 and forms a seal therewith. Thus, the handle assembly 215 permits a temperature sensing probe 322 to be inserted into the vessel 110 in a sealed manner. The wireless transmitter 300 may be energized with an external switch 382. Removing the temperature sensing probe 322 from the bore 172 permits venting of the cookware vessel 110. In other embodiments, the thermal sensor can be replaced with a plug that fills the bore 172, in the grommet 170 to provide an alternative obstruction which cooperate to seal and close the opening 205. Such a plug 111 in FIG. 6A is also a vacuum sealing means.

Figure 13:
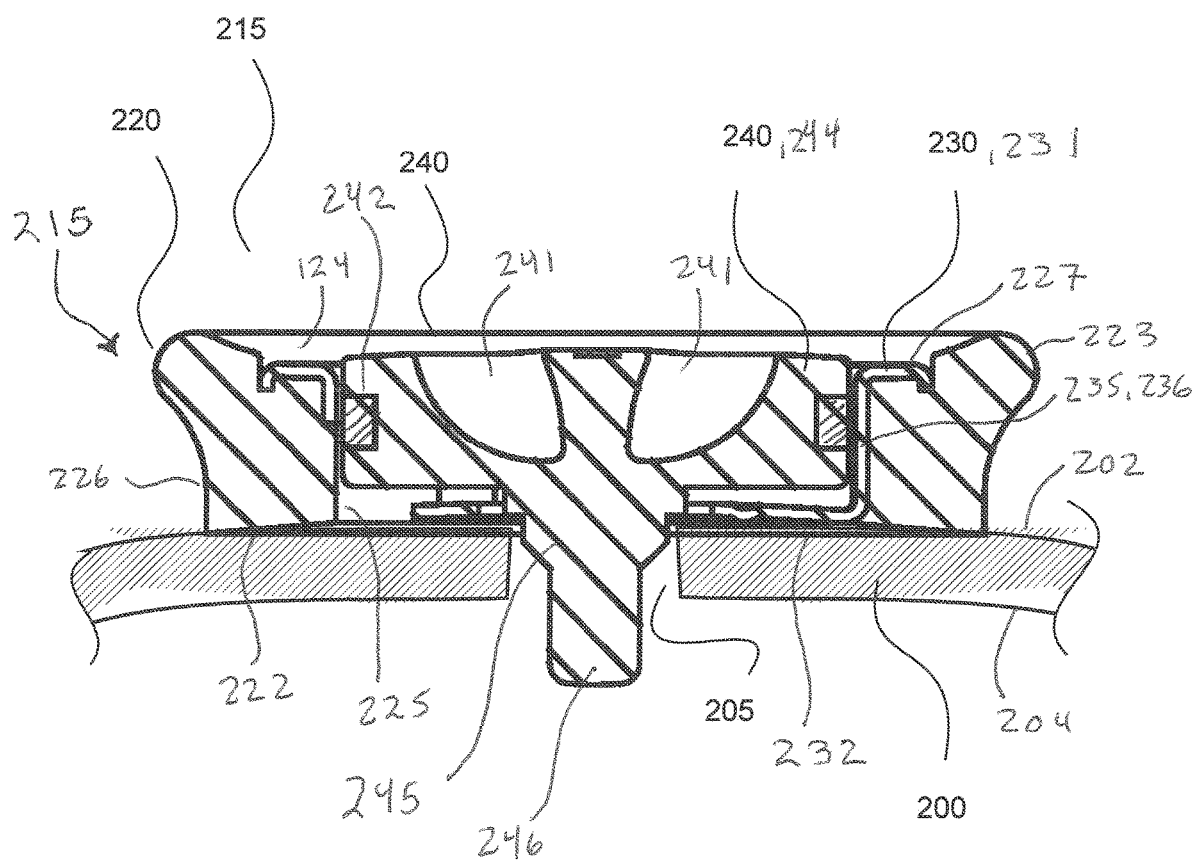
FIG. 13 is a cross-section elevation view of the lid handle in FIG. 12D in which the thermal sensor and gasket are replaced by a valve that is operative to vent to the vessel and release a vacuum formed therein.

In the embodiment illustrated in FIGS. 13-14, the valve 240 is generally recessed in the handle 220 when in the closed position. However, in some embodiments, the valve 240 may have a portion that protrudes beyond the outer surface of the handle 120 when in the closed position.

In the illustrated embodiments, the central opening 205 is circular in shape, but it is contemplated that the opening 205 may alternatively be formed having other shapes, including oval and rectangular.

Although the gasket 250 is described herein as having a generally upright "F" shape, the gasket 250 is not limited to this configuration. For example, in some embodiments, the gasket 250 may have a "U" shape that opens toward the vessel rim.

Although the lid 200 is described herein as being formed of metal, it is not limited to this material. For example, in some embodiments, the lid 200 is formed of glass or plastic. In other embodiments, the lid is formed of metal and transparent glass. In still other embodiments, the metal lid is coated with enamel or other material.

Although the lid 200 is described as having a single, central opening 205, in some embodiments, such as FIG. 6A, it is not limited to this configuration. For example, in some embodiments, the lid 100 includes multiple openings clustered at the lid center. In the illustrated embodiments, the handle 120 is formed of a material that is stable at high temperatures. In some embodiments, this material is rubber or silicone rubber, or a thermoset plastic resin, such as phenolic resin and the like.

As shown in FIG. 12D, the sidewall of the thermal probe 322 are used to seal the vessel 110 via a gasket 116 the removal of the thermal sensor 300 provides a venting means 111.

The lid 200 is a dome shaped member having an outer surface 202 and an opposing inner surface 204, which co-terminate at an annular lid rim 214. The lid 200 is formed of metal and includes a central circular opening 205 that extends between the outer surface 202 and the inner surface 204.

Referring to FIGS. 13-14F, the handle assembly 215 is used to lift the lid 200 and control vacuum pressure within the vessel 110. The handle assembly 215 includes the handle 220, a ring member 230 that secures the handle 220 to the lid 200, and the valve 240.

The annular handle 220 is situated in the geometric center of the lid 200 and surrounds the opening 205. The handle 220 is formed of a material that is stable at high temperatures, and has a first end 222 that abuts, and conforms to the shape of, the lid outer surface 202. The handle 220 has a second end 224 opposed to the first end 222. The handle second end 224 defines an outwardly protruding shoulder 223 that serves as a gripping surface, and is tapered so as to be slightly recessed relative to the shoulder 223 in a central portion thereof. The handle 220 has an inner surface 225 that extends between the first and second ends 222, 224, is of uniform diameter and of larger diameter than the opening 205. Equidistantly spaced slots 228 are formed in the handle inner surface 225 that are sized and shaped to correspond to the size and shape of struts 236 provided on the ring member 230, as discussed below. A circumferential groove 221 is formed in the handle second end 224 generally midway between the inner and outer surfaces 225, 226 of the handle 220. The annular portion of the handle second end 224 between the inner surface 225 and the groove 221 forms a land 227. The land 227 and the groove 221 are configured to receive and support a flange portion of the ring member 230, and the slot 228 is configured to receive and support the struts 236 of the ring member 230, as discussed below.

Referring to FIGS. 13, 14D, 14F and 15A, the handle assembly 215 includes the ring member 230 that is configured to secure the handle 220 to the lid 200. The ring member 230 surrounds the opening 205 and is disposed between the handle 120 and the valve 240. The ring member 230 has a cylindrical support portion 235, an annular base plate 232 that is connected to a lid-facing end of the support portion 235, and a flange portion 231 connected to an opposed end of the support portion 235. In some embodiments, the support portion 235 is formed of struts 236 that extend between the flange portion 231 and the base portion 232. The base plate 232 is disposed concentrically about the lid opening 205, and is secured to the lid outer surface 102, for example by welding. To this end, the base plate 232 includes mutually spaced spot weld centering holes 239. The flange portion 231 protrudes outward from the support portion 235 in a direction away from the opening 205 and toward the lid rim 110. The flange portion 231 is shaped to conform to the land 127 and the groove 121 of the handle 120. In use, the base portion 232 is fixed to the outer surface 102 of the lid 100 so as to surround the opening 205, and the struts 236 are received in the slots 128. Since the slots 128 engage the struts 236, the handle 120 is prevented from rotating relative to the lid 100. In addition, the flange portion 231 is received within and engages the land 127 and groove 121 of the handle 120, whereby the handle 120 is retained against the outer surface 102 of the lid 100.

Referring to FIGS. 13 and 14A-C, the handle assembly 215 includes the vacuum sealable valve 240 that is disposed concentrically within the ring member 230 and the annular handle 120. The valve 240 is elastic, and has a disc-shaped main portion 244 disposed within the ring member 230 so as to be moveable relative to the ring member 230. The valve 240 also includes a generally-cylindrical stem portion 245, and an elongated release portion 246. The stem portion extends from a lid-facing side of the main portion 244 and is shaped and dimensioned to seal the lid opening 205 in some valve positions 240 relative to the handle 120. The release portion 246 extends from the lid-facing side of the stem portion 245. The release portion 246 terminates in a pair of legs 248 that protrude from opposed sides of the release portion 246 in a direction general parallel to the lid 100 (FIG. 14B). The legs 248 are dimensioned to be larger than the opening 205, whereby the legs 248 retain the valve 240 in the opening 205. In addition, in the direction transverse to the legs 248, the release portion 246 has a cross sectional dimension that is small relative to the stem portion 245 and the opening 205 (FIGS. 13 and 14A). In other positions of the valve 240, the release portion 246 is configured to provide venting to release a vacuum within the vessel 110 by admitting external air into the vessel 110, as discussed further below.

Referring to FIG. 15B, the valve 240 is operative to translate relative to the handle 220 and the opening 205 between a first, closed position (FIG. 15B) and a second, open position (FIG. 15C). In the closed position, the valve 240 is retracted into the space defined by the handle inner surface 225. As a result, the stem portion 245 is disposed in, and sealingly obstructs, the opening 205. That is, when the valve 240 is in the closed position, the stem portion 245 prevents air flow through the opening 205. In the open position, the valve main portion 244 is partially advanced outward from the handle 220 so that the stem portion 245 is withdrawn from the opening 205. In this position, the stem portion 245 is located on an outer surface-side of the lid 200 so as to be adjacent to and aligned with the opening 205. In addition, the release portion 246 extends through the opening 205. Since the release portion 246 has a dimension that is smaller than that of the opening 205, air can flow through the gap between the release portion 246 and the opening 205, whereby the vessel 110 is vented.

The valve 240 is manually opened or closed at the user's discretion. To this end, the outer face 244a of the main portion 244 includes indents 241 configured to permit gripping of the valve 240.

The valve main portion 244 may include features that permit the user to visually determine the position of the valve 240 relative to the lid 100. In the illustrated embodiment, the peripheral edge 244b of the main portion 244 includes a circumferentially-extending groove 243, and an indicator ring 242 is disposed in the groove 243. The indicator ring is formed having a color that contrasts with the color of the handle 120 and possibly also the other portions of the valve 240. When the valve 240 is in the open position (FIG. 15C), the indicator ring 242 is visible to the user, indicating the valve is in the open position. When the valve 240 is in the closed position (FIG. 15B), the valve main portion 244 is retracted within the handle 220 and the indicator ring 242 is not visible to the user, indicating that the valve 240 is in the closed position.

In FIG. 16A, the vessel is capable of operation above and below atmospheric pressure, in which the air and steam are initially expelled through a valve before operating in the vacuum mode, in which the valve is either one way or closes after time t2. The valve can be closed manually after time t2, using a signal such as a light, sound, from the base 400 for the user to perceive. Alternatively, the valve can be closed with a solenoid type valve via an electronic signal from the controller 430. The lid 200 has a bayonet or jaw type clamps to retain pressure after the valve is sealed. This configuration allows cooking at controlled temperatures above about 190° F., once the valve is closed, up the safe operating pressure set by a safety release valve, which is generally at between about 5 to 15 psi.

FIG. 17 is a cross-sectional elevation view of another embodiment of the cooking apparatus 1000 suitable for low-pressure steam cooking in which the vessel 110 containing the raw food, or food to be warmed is within another vacuum vessel 700. Preferably vessel 700 is closed with hinges 750 which attach the lid 17200 that contains the temperature sensor 17122 for measuring vapor temperature. A gasket 17250 seals to lid 17200 to the lower portion 730 that extends above vessel 110 to the hinged rim. The vessel 700 may also contain a planar heating member 17460 that makes direct contact with the bottom 115 of the vessel 110. More preferably, a second thermal sensor 17120 is spring loaded and makes contact with the exterior bottom 115 of the vessel 110, preferably being in the center of but not directly heated by planar heating elements 17460. The planar heating elements 17460 can be heated by electric resistance heating coils, in the which the current is controlled by the controller 17430, in response to the predetermined time and temperatures regimes described above, as measured by one or more of thermal sensor 17122 or 17120.

More preferably the control system 17430 is integrated into base 17100 of a device 1000 that includes vessel 700, along with the connection to the planar heating members 17460. A control panel and appropriate status indicators would be on the exterior of the vessel 700 and/or base 17100.

The vapor temperature sensor 17122 can then be in signal communication with the controller 17430 via a wired connection, such as one 730 extending from the lid 710 to the sidewall outside vessel 700. Alternatively, the vapor thermal sensor 17122' can be in niche in or extending from the sidewall of the interior of vessel 700, being above or spaced away from the food containing vessel 110. The vent means 17111 in lid 17200 preferably is a one way releasable valve that prevents pressure build-up in vessel 700, but will self close to form a vacuum, and as is easily opened by pulling upward, such as 220

Hence, the apparatus 1000 of FIG. 17 has the advantage that external power of the controller and heaters avoids the need for a battery powered or other RF transmitter in the lid, simplifying consumer use and reducing costs. As with other embodiments, the device 1000 is also capable of other cooking mode, such as rice cooking or slow cooking liquid ingredients mixture, either with or without the exclusion of air depending on the state of vent mean/valve 111.

In another aspect of the invention, illustrated in FIG. 18, the vacuum compatible vessel 110 is filled with food stuffs, evacuated to a partial vacuum, and then introduced into temperature controlled oven 18400 in which the temperature is less than 100° C. The vacuum in the vessel 110 can be achieved by a heating process to create steam and displace air, after which a slight cooling on condensation creates the vacuum. This mode avoids the need for an exterior electronic thermal sensor 300 in the lid 200. The replacement of air with steam can be accomplished on a regular store top or range, as well as an induction base, provided the heating cycle is timed and/or measured to expel most of the air, as described with respect to FIGS. 2 and 4.

Alternatively, the vessel 110 can be evacuated with a hand held or removable vacuum pump line via a closable or 1 way valve. The surrounding oven 18400 then replaces the heat source, such as the induction burner, and so long as the oven 18400 deploys an accurate internal temperature measurement device 18322 and an advanced thermal control system, such as a PID type feedback system to maintain the temperature at constant level, a thermal measuring device need not enter the vessel. Convection ovens are particularly well suited to this purpose, as the convective mixing of air provides a uniform temperature. So long as the temperature measurement device 18322 measures the oven air temperature, the food stuff inside the vessel will not exceed this temperature, and will slowly reach this temperature throughout the food contained therein.

The convection oven 18400 in FIG. 18 would preferably deploy an internal ventilation system 18001 in which a fan 18430 withdraws air from a portion of the oven 18400 and then return the air to a different part of the oven by passing it over a heater element 18460. At least one thermal probe 18322 is in signal communication with a control system to continuously measure at least one of the internal oven temperature, or the temperature inside the vessel (18322') being insert in a gasket or other sealable portion of the lid 200 or lid vent 240. The opposing portion of probe 18322' would be connect to the oven's internal controller via a feed-through 18301 in the interior oven wall after the vessel 110 were evacuated, either with a hand-held pump or pump line, or by heating and cooling on range top/induction base. The control system can energize the heater and or fans as required to maintain a predetermined temperature or temperature profile, as generally described with respect to other embodiment. This method has advantages in restaurants and other commercial kitchens in that a single oven can hold multiple vessels for cooking and storage until the food needs to be served.

Figure 20:
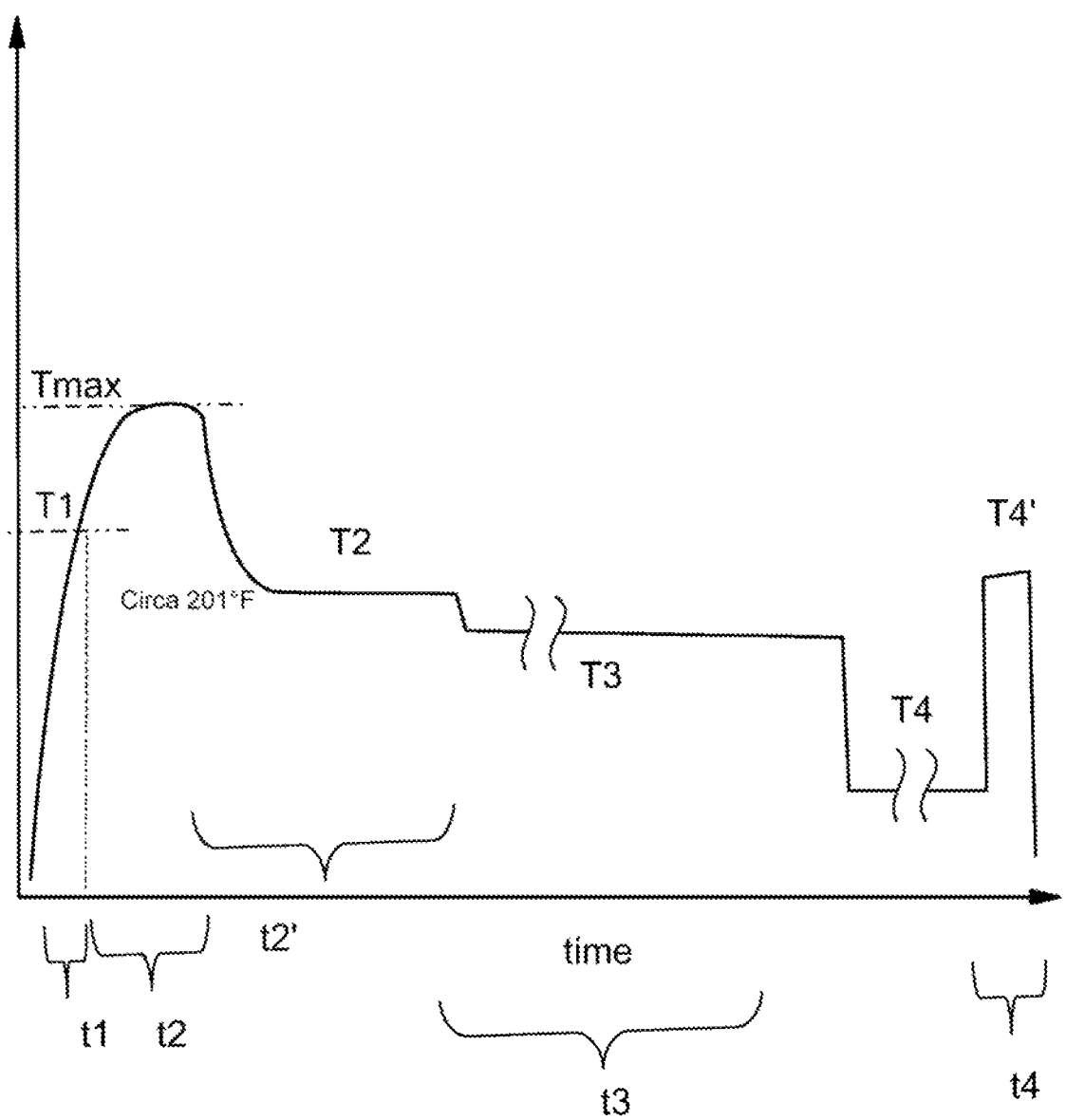
FIG. 20 is a schematic diagram of the temporal variation of temperature in the vessel of FIG. 1 or 6 resulting from another mode of operation according to the flow chart in FIG. 2.

It should now be appreciated that the inventive cooking apparatus and method is desirably deployed on induction ranges that are built into a counter top, and include space for multiple vessels, or in kitchen that desire to use multiple devices 1000 at the same time. In order to avoid confusion of signal sent by a different transmitter 320 in each thermal sensor 300, the sensors can transmit at different frequencies. However, a simpler means is illustrated in FIG. 20 in which at the time of each transmission of signals (or signal packets for temperature measurements or control instructions) to the receiver 420 and hence power supply controller 430, in which each sensor sends a pairs of signals signal (S1 and S2) with a different predetermined time interval between each signal in the pair. Accordingly, the controller 430 of each of the devices 1000 are programmed to recognize only pairs of signals at the associated predetermined spacing. In the worst case shown in FIG. 19, when the first and second thermal sensor 330 send a first signal in the pair at the same time, each controller 430 and 430' will only receive 3 signals or signal packets, and is also programmed with instructions to be operative to ignore the value of the first signal or signal packet, and use the second signal or signal packet that arrives at the proper delay time (from the overlapping pair) for control purposes.

FIG. 20 illustrates another important advantage of the inventive cooking apparatus and method over Sous Vide cooking in that large and irregular shaped food with open body cavities, such as whole fish and poultry can be cooked in an accelerated method using multiple temperature controlled stages. The same mode can be deployed in rice cooking or slow cooking liquid ingredients and mixture, in which it is desirable to heat or seer food art a high temperature briefly, and then complete cooking at a lower temperature. The FIG. 20 is a schematic diagram of the temporal variation of temperature and in the vessel of FIG. 1 resulting from another mode of operation according to the flow chart in FIG. 2 First, the heater 460 is energized at full power and the time, t1, to reach T1 (generally 201° F.) is logged by controller 430. The time, t2, to hold at maximum power (during which Tmax is reached) and expel air is calculated as described above and the heater is then de-energized to allow cooling to a first pre-determined cooking temperature T2. T2 is maintained using any of the process control schemes described above for time t2'. In the case of large poultry or whole fish of 3-4 lbs, or frozen seafood, T2 is about 150 to 180° F. and the holding time t3 about 10-30 minutes. Then after t2' is reached the heater is again de-energized to allow cooling to T3, during which T3 is maintained using any of the process control schemes described above for time t3. T3 is generally the final cooking temperature that corresponds to the level of doneness of protein, such as circa 128-135° F. for fish or seafood, and 130-165° F. for meat or poultry, in which t3 is dependent on the food thickness or weight. In this example, T3 is the optimal temperature to avoid over cooking and dehydrating proteins, keeping the cooked foodstuff satisfyingly moist and flavorful. More stages, between T and T3, can be deployed to accelerate cooking, while a progress lowering of temperature to avoid overheating the food exterior in the earlier stages.

After t3, the heater controller 430 can be operative to hold the food at a lower temperature, say T4, until serving is desired. In this case a manual instruction can be entered to heat the interior of the vessel 110 to T4', which is a final serving temperature, generally 150 to 170° F., to just warm the food exterior to this serving temperature, which takes only about for 1-4 minutes. The staged heating illustrated in FIG. 20 allows large poultry and whole fish, which are not amendable to Sous Vide cooking, to be finished in less than 1 to 1.5 hours. Frozen fish and shellfish are also amenable to this cooking method, and will not be overheated in the initial stage of creating steam to expel air. This staged cooking is possible because the air excluded state in which low pressure steam fills the vessel interior allows a rapid and accurate transition between temperature stages without overshooting the desired control limits.

In addition after cooking is complete, the foods can be held at the final cooking or a lower temperature until the cook is ready to server, in which case the controller 430 can be manually instructed to increase the temperature to a fourth or serving temperature for a limited time that will still avoid overheating the interior, but give a warmer flavor and mouth feel to food from a slightly warmer exterior of about 160 to 170° F. The ability to rapidly heat food to a slight higher temperature (T4 in FIG. 3) than the cooking temperature (T3 or T3') just before serving to enhance the mouth feel of warmer food and increase flavor release without over cooking. This is not practical using a water bath as a cooking medium because of the relatively long time it takes to increase the bath temperature, where the water vapor temperature will increase almost immediately when the vessel 110 is heated internally by the induction coils.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. A process for cooking, the process comprising the steps of:
   a) providing a vessel capable of retaining fluid therein having a lid that is in sealable engagement with a rim thereof,
   b) introducing at least one of water or a water containing aqueous fluid in the vessel,
   c) placing a foodstuff in the vessel,
   d) placing the lid on the vessel,
   e) converting water in the vessel to a sufficient quantity of water vapor to replace the atmospheric content of the vessel comprising:
     (i) applying heating power to the vessel,
     (ii) measuring a first period of time taken for the heating power to increase temperature within the vessel to a predetermined temperature of at least about 94° C. and
     (iii) maintaining the heating power applied to the vessel for a 2nd period of time thereafter that is determined from the first period of time, wherein after the 2nd period of time a sufficient quantity of the water has been converted to water vapor to replace the atmospheric content of the vessel and the temperature in the vessel is at a first temperature that is greater than the predetermined temperature, f) reducing the heating power to the vessel after the 2nd period of time to bring the vessel to a 2nd temperature lower than the first temperature, wherein condensation of the water vapor within the vessel causes an internal reduction pressure sufficient to engage the lid to seal with the rim of the vessel, and g) maintaining the vessel at the 2nd temperature for a predetermined amount of time.

2. The process for cooking according to claim 1, wherein the step of applying heating power to vessel comprises applying the heating power from a radiant heat source below the vessel.

3. The process for cooking according to claim 1, wherein the radiant heat source is an induction cooking base.

4. The process for cooking according to claim 3, wherein the lid comprises means to measure the temperature in the vessel and the step of maintaining the vessel at the 2nd temperature further comprises the induction cooking base applying a series of spaced apart power pulses, wherein a maximum temperature rise from each pulse is measured with the means to measure temperature, and the heating power in each subsequent pulse is determined by a measured variance between the maximum temperature rise from the previous pulse and the 2nd temperature.

5. The process for cooking according to claim 1, wherein the lid further comprises means to measure the temperature in the vessel.

6. The process for cooking according to claim 5, wherein the first period of time is the time taken for the heating power to increase the temperature in the vessel from room temperature to the predetermined temperature, and wherein the 2nd period of time is the first period of time, less 60 seconds, then divided by 2.

7. The process for cooking according to claim 1, wherein maintaining the vessel at the second temperature comprises:

applying heating power in a series of spaced apart power pulses;

measuring a maximum temperature resulting from each of the series of spaced apart power pulses with a means to measure temperature; and determining the heating power to be applied in each subsequent pulse based on the previous pulse and a variance between the maximum measured temperature from the previous pulse and the second temperature.

8. The process for cooking according to claim 7, wherein the heating power in the series of spaced apart power pulses is modulated by pulse width.

9. The process for cooking according to claim 7, wherein the heating power in the series of spaced apart power pulses is modulated by output power amount.

* * * * *